United States Patent
Yi et al.

(10) Patent No.: US 9,736,696 B2
(45) Date of Patent: Aug. 15, 2017

(54) ANTENNA SPLITTING METHOD IN ACTIVE ANTENNA SYSTEM AND CONTROLLER

(71) Applicant: Huawei Technologies Co., Ltd., Shenzhen (CN)

(72) Inventors: Li Yi, Chengdu (CN); Jianshe Dai, Chengdu (CN); Yujuan Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/130,963

(22) Filed: Apr. 16, 2016

(65) Prior Publication Data

US 2016/0234693 A1    Aug. 11, 2016

Related U.S. Application Data

(63) Continuation of application No. PCT/CN2013/085634, filed on Oct. 22, 2013.

(51) Int. Cl.
*H04W 4/00* (2009.01)
*H04W 72/00* (2009.01)
(Continued)

(52) U.S. Cl.
CPC .......... *H04W 16/08* (2013.01); *H04B 17/318* (2015.01)

(58) Field of Classification Search
CPC . H04W 28/08; H04W 88/10; H04W 72/0486; H04W 16/08; H04B 17/318
(Continued)

(56) References Cited

U.S. PATENT DOCUMENTS

| 6,421,005 B1 | 7/2002 | Weaver et al. |
| 2007/0142057 A1 | 6/2007 | Murakami et al. |

(Continued)

FOREIGN PATENT DOCUMENTS

| CN | 102724682 A | 10/2012 |
| CN | 102821393 A | 12/2012 |

(Continued)

OTHER PUBLICATIONS

3rd Generation Partnership Project; Technical Specification Group Radio Access Network; Study of Radio Frequency (RF) and Electromagnetic Compatibility (EMC) Requirements for Active Antenna Array System (AAS) Base Station (Release 12), 3GPP TR 37.840 V12.0.0 (Mar. 2013), 84 pages.

*Primary Examiner* — Joshua Schwartz
(74) *Attorney, Agent, or Firm* — Slater Matsil, LLP

(57) ABSTRACT

The present invention relates to an antenna splitting method in an active antenna system and a controller, where the method includes: when load of an active antenna system AAS cell is greater than or equal to a load threshold, if a cell in an optimized area is not overloaded, load of a first cell is less than the load of the AAS cell, and load of a second cell is less than the load of the AAS cell, acquiring a first antenna parameter combination corresponding to a maximum capacity of the optimized area; and splitting an AAS antenna according to the first antenna parameter combination. The antenna splitting method in an active antenna system and the controller according to embodiments of the present invention can effectively reduce the load of a heavily loaded AAS cell, and effectively increase a capacity of the optimized area.

18 Claims, 5 Drawing Sheets

(51) Int. Cl.
  *H04W 16/08*    (2009.01)
  *H04B 17/318*   (2015.01)
(58) Field of Classification Search
  USPC .......................................................... 455/453
  See application file for complete search history.

(56) References Cited

U.S. PATENT DOCUMENTS

| | | |
|---|---|---|
| 2010/0295730 A1 | 11/2010 | Jeon |
| 2011/0103504 A1 | 5/2011 | Ma |
| 2013/0217435 A1* | 8/2013 | Tarraf .................. H04W 88/06 |
| | | 455/552.1 |
| 2013/0235807 A1 | 9/2013 | Lee et al. |
| 2014/0098783 A1 | 4/2014 | Wan et al. |
| 2015/0382212 A1* | 12/2015 | Elliott .................. H04W 24/06 |
| | | 370/252 |
| 2016/0309376 A1* | 10/2016 | Liu .................. H04W 36/0055 |

FOREIGN PATENT DOCUMENTS

| | | |
|---|---|---|
| CN | 102904018 A | 1/2013 |
| EP | 1184937 A1 | 3/2002 |
| JP | 2002064427 A | 2/2002 |
| JP | 2007166353 A | 6/2007 |

\* cited by examiner

ANTENNA SPLITTING METHOD IN ACTIVE ANTENNA SYSTEM AND CONTROLLER

This application is a continuation of International Patent Application No. PCT/CN2013/085634, filed on Oct. 22, 2013, which is hereby incorporated by reference in its entirety.

TECHNICAL FIELD

The present invention relates to the field of wireless communications technologies, and in particular, to an antenna splitting method in an active antenna system and a controller.

BACKGROUND

Currently, a base station in a wireless network is already extremely crowded with antennas and devices of various frequency bands and standards. If a new system, for example, a Long Term Evolution (LTE) base station, needs to be deployed, no free space is available for an antenna, and no free space is available in some equipment rooms, either. An active antenna system (AAS) can not only ensure that a service of an existing network remains unchanged, but also provide a service based on a new frequency band or a new system. The AAS integrates a radio remote unit (RRU) and an antenna, and has advantages such as a reduced device footprint, a reduced device installation time, and a remotely adjustable antenna downtilt, azimuth, and beamwidth.

An existing AAS antenna splitting technology cannot adapt to a dynamic change of a network, and cannot effectively increase a system capacity.

SUMMARY

In view of this, a technical problem that needs to be resolved by the present invention is: how to correctly select an AAS antenna beam to split a heavily loaded AAS cell so as to effectively increase a capacity of the AAS cell.

To resolve the foregoing technical problem, according to a first aspect of the present invention, an antenna splitting method in an active antenna system is provided, including acquiring a first antenna parameter combination corresponding to a maximum capacity of the optimized area when load of an active antenna system (AAS) cell is greater than or equal to a load threshold, if a cell in an optimized area is not overloaded, load of a first cell is less than the load of the AAS cell, and load of a second cell is less than the load of the AAS cell. The first cell and the second cell are two cells obtained after the AAS cell is pre-split, the optimized area is the AAS cell, or is the AAS cell and at least one neighboring cell of the AAS cell, and the first antenna parameter combination includes a first antenna parameter of the first cell and a second antenna parameter of the second cell, where: the first antenna parameter includes a downtilt of a first antenna and a transmit power of the first antenna, and the second antenna parameter includes a downtilt of a second antenna and a transmit power of the second antenna. The method further includes splitting an AAS antenna according to the first antenna parameter combination.

With reference to the first aspect, in a first possible implementation manner, the acquiring a first antenna parameter combination corresponding to a maximum capacity of the optimized area includes: acquiring measurement information that is collected by user equipment in the optimized area within a preset duration; performing estimation on the basis of the measurement information by using multiple antenna parameter combinations, to obtain an estimated value that is of the measurement information and corresponding to each antenna parameter combination of the multiple antenna parameter combinations; calculating, according to the estimated value of the measurement information, a capacity that is of the optimized area and corresponding to each antenna parameter combination; and acquiring, according to the capacity that is of the optimized area and corresponding to each antenna parameter combination, the first antenna parameter combination corresponding to the maximum capacity of the optimized area.

With reference to the first possible implementation manner of the first aspect, in a second possible implementation manner, the measurement information includes a signal to interference plus noise ratio (SINR) and a throughput that are of the user equipment; and the performing estimation on the basis of the measurement information by using multiple antenna parameter combinations, to obtain an estimated value that is of the measurement information and corresponding to each antenna combination of the multiple antenna parameter combinations specifically includes: performing estimation on the basis of the SINR and the throughput by using the multiple antenna parameter combinations, to obtain an estimated value of the SINR and an estimated value of the throughput that are corresponding to each antenna parameter combination of the multiple antenna parameter combinations.

With reference to the second possible implementation manner of the first aspect, in a third possible implementation manner, the calculating, according to the estimated value of the measurement information, a capacity that is of the optimized area and corresponding to each antenna parameter combination specifically includes: calculating, according to the estimated value of the SINR and the estimated value of the throughput, a resource block (RB) usage and a load difference rate that are of the optimized area and corresponding to each antenna parameter combination; and calculating, according to the resource block (RB) usage and the load difference rate, the capacity that is of the optimized area and corresponding to each antenna parameter combination.

With reference to the first aspect, in a fourth possible implementation manner, the acquiring a first antenna parameter combination corresponding to a maximum capacity of the optimized area further includes: a coverage counter that is of the optimized area and corresponding to the first antenna parameter combination is greater than or equal to a coverage counter threshold.

With reference to the fourth possible implementation manner of the first aspect, in a fifth possible implementation manner, the acquiring a first antenna parameter combination corresponding to a maximum capacity of the optimized area includes: acquiring multiple antenna parameter combinations that meet a coverage condition, where the coverage condition refers to that the coverage counter of the optimized area is greater than or equal to the coverage counter threshold; and calculating the capacity that is of the optimized area and corresponding to the multiple antenna parameter combinations that meet the coverage condition, to acquire the first antenna parameter combination corresponding to the maximum capacity.

With reference to the fifth possible implementation manner of the first aspect, in a sixth possible implementation manner, the acquiring antenna parameter combinations that meet a coverage condition includes: acquiring measurement information that is collected by user equipment in the optimized area within a preset duration; performing estimation on the basis of the measurement information by using multiple antenna parameter combinations, to obtain an estimated value that is of the measurement information and corresponding to each antenna parameter combination of the multiple antenna parameter combinations; calculating, according to the estimated value of the measurement information, a coverage counter that is of the optimized area and corresponding to each antenna parameter combination; and comparing calculated coverage counters corresponding to all the antenna parameter combinations with the coverage counter threshold, to acquire the multiple antenna parameter combinations that meet the coverage condition.

With reference to the sixth possible implementation manner of the first aspect, in a seventh possible implementation manner, the measurement information includes an SINR and a reference signal received power (RSRP) that are of the user equipment; and the performing estimation on the basis of the measurement information by using multiple antenna parameter combinations, to obtain an estimated value that is of the measurement information and corresponding to each antenna parameter combination of the multiple antenna parameter combinations specifically includes: performing estimation on the basis of the SINR and the RSRP by using the multiple antenna parameter combinations, to obtain an estimated value of the SINR and an estimated value of the RSRP that are corresponding to each antenna parameter combination of the multiple antenna parameter combinations; and the calculating, according to the estimated value of the measurement information, the coverage counter that is of the optimized area and corresponding to each antenna parameter combination specifically includes: calculating, according to the estimated value of the SINR and the estimated value of the RSRP, the coverage counter that is of the optimized area and corresponding to each antenna parameter combination.

With reference to the seventh possible implementation manner of the first aspect, in an eighth possible implementation manner, the measurement information further includes a throughput of the user equipment; and the performing estimation on the basis of the measurement information by using multiple antenna parameter combinations, to obtain an estimated value that is of the measurement information and corresponding to each antenna parameter combination of the multiple antenna parameter combinations specifically further includes: performing estimation on the basis of the throughput by using the multiple antenna parameter combinations, to obtain an estimated value that is of the throughput and corresponding to each antenna parameter combination of the multiple antenna parameter combinations; and the calculating the capacity that is of the optimized area and corresponding to the multiple antenna parameter combinations that meet the coverage condition, to acquire the first antenna parameter combination corresponding to the maximum capacity specifically includes: calculating, according to the estimated value of the SINR and the estimated value of the throughput, a resource block (RB) usage and a load difference rate that are of the optimized area and corresponding to each antenna parameter combination that meets the coverage condition; and calculating, according to the RB usage and the load difference rate, the capacity that is of the optimized area and corresponding to each antenna parameter combination that meets the coverage condition, to acquire an antenna parameter combination corresponding to the maximum capacity.

With reference to the fourth possible implementation manner of the first aspect, in a ninth possible implementation manner, the acquiring a first antenna parameter combination corresponding to a maximum capacity of the optimized area includes:

acquiring measurement information that is collected by user equipment in the optimized area within a preset duration;

performing estimation on the basis of the measurement information by using multiple antenna parameter combinations, to obtain an estimated value that is of the measurement information and corresponding to each antenna parameter combination of the multiple antenna parameter combinations;

calculating, according to the estimated value of the measurement information, a capacity that is of the optimized area and corresponding to each antenna parameter combination; and acquiring, according to the calculated capacity that is of the optimized area and corresponding to each antenna parameter combination, the first antenna parameter combination that is of antenna parameter combinations meeting the coverage condition and that is corresponding to a maximum capacity of the optimized area, where the coverage condition refers to that the coverage counter of the optimized area is greater than or equal to the coverage counter threshold.

With reference to the first aspect and any one of the possible implementation manners of the first aspect, in a tenth possible implementation manner, the capacity counter of the optimized area is obtained by using Formula 1:

$$G1 = k1*p + k2*q \qquad \text{Formula 1}$$

where p is the RB usage of the optimized area; q is the load difference rate of the optimized area; k1 and k2 are a proportion of the RB usage of the optimized area and a proportion of the load difference rate of the optimized area, respectively, and k1+k2=1; and G1 is the capacity counter, where a smaller capacity counter indicates a larger capacity.

With reference to any one of the fourth to the tenth possible implementation manners of the first aspect, in an eleventh possible implementation manner, Formula 2 is used as a formula for calculating the coverage counter:

$$F1 = k3 \frac{\sum_{i=1}^{n}(DLRSRP(i) \geq \text{Thresh}_{DLRSRP})}{n} + k4 \frac{\sum_{i=1}^{n}(DLRSSINR(i) \geq \text{Thresh}_{DLRSSINR})}{n} \qquad \text{Formula 2}$$

where n is a quantity of pieces of the acquired measurement information of the optimized area; i=1, 2, . . . , n, where i is an integer; DLRSRP(i) and DLRSSINR(i) are the estimated value of the RSRP and the estimated value of the SINR, respectively; $\text{Thresh}_{DLRSRP}$ and $\text{Thresh}_{DLRSSINR}$ are an RSRP threshold and an SINR threshold, respectively; k3 and k4 are a proportion of the RSRP and a proportion of the SINR, respectively, and k3+k4=1; when DLRSRP(i) ≥$\text{Thresh}_{DLRSRP}$, (DLRSRP(i)≥$\text{Thresh}_{DLRSRP}$) is 1, and otherwise, (DLRSRP(i)≥$\text{Thresh}_{DLRSRP}$) is 0; and F1 is the coverage counter.

To resolve the foregoing technical problem, according to a second aspect of the present invention, a controller is provided, including:

an acquiring unit, configured to: when load of an active antenna system (AAS) cell is greater than or equal to a load threshold, if a cell in an optimized area is not overloaded, load of a first cell is less than the load of the AAS cell, and load of a second cell is less than the load of the AAS cell, acquire a first antenna parameter combination corresponding to a maximum capacity of the optimized area, where the first cell and the second cell are two cells obtained after the AAS cell is pre-split, the optimized area is the AAS cell, or is the AAS cell and at least one neighboring cell of the AAS cell, and the first antenna parameter combination includes a first antenna parameter of the first cell and a second antenna parameter of the second cell, where: the first antenna parameter includes a downtilt of a first antenna and a transmit power of the first antenna, and the second antenna parameter includes a downtilt of a second antenna and a transmit power of the second antenna; and a splitting unit, configured to split an AAS antenna according to the first antenna parameter combination.

With reference to the second aspect, in a first possible implementation manner, the acquiring unit includes:

a first acquiring subunit, configured to acquire measurement information that is collected by user equipment in the optimized area within a preset duration;

a first estimation subunit, configured to perform estimation on the basis of the measurement information by using multiple antenna parameter combinations, to obtain an estimated value that is of the measurement information and corresponding to each antenna parameter combination of the multiple antenna parameter combinations;

a first capacity calculation subunit, configured to calculate, according to the estimated value of the measurement information, a capacity that is of the optimized area and corresponding to each antenna parameter combination; and a second acquiring subunit, configured to acquire, according to the capacity that is of the optimized area, corresponding to each antenna parameter combination, and calculated by the first capacity calculation subunit, the first antenna parameter combination corresponding to the maximum capacity of the optimized area.

With reference to the first possible implementation manner of the second aspect, in a second possible implementation manner, the measurement information includes a signal to interference plus noise ratio (SINR) and a throughput that are of the user equipment; and the first estimation subunit is specifically configured to:

perform estimation on the basis of the SINR and the throughput by using the multiple antenna parameter combinations, to obtain an estimated value of the SINR and an estimated value of the throughput that are corresponding to each antenna combination of the multiple antenna parameter combinations.

With reference to the second possible implementation manner of the second aspect, in a third possible implementation manner, the first capacity calculation subunit is specifically configured to:

calculate, according to the estimated value of the SINR and the estimated value of the throughput that are obtained by the first estimation subunit, a resource block (RB) usage and a load difference rate that are of the optimized area and corresponding to each antenna parameter combination; and calculate, according to the resource block (RB) usage and the load difference rate, the capacity that is of the optimized area and corresponding to each antenna parameter combination.

With reference to the second aspect, in a fourth possible implementation manner, a coverage counter that is of the optimized area and corresponding to the first antenna parameter combination is greater than or equal to a coverage counter threshold.

With reference to the fourth possible implementation manner of the second aspect, in a fifth possible implementation manner, the acquiring unit includes:

a third acquiring subunit, configured to acquire multiple antenna parameter combinations that meet a coverage condition, where the coverage condition refers to that the coverage counter of the optimized area is greater than or equal to the coverage counter threshold; and a fourth acquiring subunit, configured to calculate the capacity that is of the optimized area and corresponding to the multiple antenna parameter combinations that meet the coverage condition, to acquire the first antenna parameter combination corresponding to the maximum capacity.

With reference to the fifth possible implementation manner of the second aspect, in a sixth possible implementation manner, the third acquiring subunit includes:

a fifth acquiring subunit, configured to acquire measurement information that is collected by user equipment in the optimized area within a preset duration;

a second estimation subunit, configured to perform estimation on the basis of the measurement information by using multiple antenna parameter combinations, to obtain an estimated value that is of the measurement information and corresponding to each antenna parameter combination of the multiple antenna parameter combinations;

a second coverage calculation subunit, configured to calculate, according to the estimated value of the measurement information, the coverage counter that is of the optimized area and corresponding to each antenna parameter combination; and a sixth acquiring subunit, configured to compare calculated coverage counters corresponding to all the antenna parameter combinations with the coverage counter threshold, to acquire the multiple antenna parameter combinations that meet the coverage condition.

With reference to the sixth possible implementation manner of the second aspect, in a seventh possible implementation manner, the measurement information includes an SINR and a reference signal received power (RSRP) that are of the user equipment; and the second estimation subunit is specifically configured to:

perform estimation on the basis of the SINR and the RSRP by using the multiple antenna parameter combinations, to obtain an estimated value of the SINR and an estimated value of the RSRP that are corresponding to each antenna parameter combination of the multiple antenna parameter combinations; and the second coverage calculation subunit is specifically configured to:

calculate, according to the estimated value of the SINR and the estimated value of the RSRP, the coverage counter that is of the optimized area and corresponding to each antenna parameter combination.

With reference to the seventh possible implementation manner of the second aspect, in an eighth possible implementation manner, the measurement information further includes a throughput of the user equipment; and the second estimation subunit is specifically further configured to:

perform estimation on the basis of the throughput by using the multiple antenna parameter combinations, to obtain an estimated value that is of the throughput and corresponding to each antenna parameter combination of the multiple antenna parameter combinations; and the fourth acquiring subunit is specifically configured to:

calculate, according to the estimated value of the SINR and the estimated value of the throughput, a resource block (RB) usage and a load difference rate that are of the optimized area and corresponding to each antenna parameter combination that meets the coverage condition; and calculate, according to the RB usage and the load difference rate, the capacity that is of the optimized area and corresponding to each antenna parameter combination that meets the coverage condition, to acquire an antenna parameter combination corresponding to the maximum capacity.

With reference to the fourth possible implementation manner of the second aspect, in a ninth possible implementation manner, the acquiring unit is specifically configured to:

acquire measurement information that is collected by user equipment in the optimized area within a preset duration;

perform estimation on the basis of the measurement information by using multiple antenna parameter combinations, to obtain an estimated value that is of the measurement information and corresponding to each antenna parameter combination of the multiple antenna parameter combinations;

calculate, according to the estimated value of the measurement information, a capacity that is of the optimized area and corresponding to each antenna parameter combination; and acquire, according to the capacity that is of the optimized area, corresponding to each antenna parameter combination, and calculated by the third capacity calculation subunit, the first antenna parameter combination that is of antenna parameter combinations meeting the coverage condition and that is corresponding to a maximum capacity of the optimized area, where the coverage condition refers to that the coverage counter of the optimized area is greater than or equal to the coverage counter threshold.

With reference to the second aspect and any one of the possible implementation manners of the second aspect, in a tenth possible implementation manner, the capacity counter of the optimized area is obtained by using Formula 1:

$$G1 = k1*p + k2*q \quad \text{Formula 1}$$

where p is the RB usage of the optimized area; q is the load difference rate of the optimized area; k1 and k2 are a proportion of the RB usage of the optimized area and a proportion of the load difference rate of the optimized area, respectively, and k1+k2=1; and G1 is the capacity counter, where a smaller capacity counter indicates a larger capacity.

With reference to any one of the fourth to the tenth possible implementation manners of the second aspect, in an eleventh possible implementation manner, Formula 2 is used as a formula for calculating the coverage counter:

$$F1 = k3 \frac{\sum_{i=1}^{n}(DLRSRP(i) \geq \text{Thresh}_{DLRSRP})}{n} + k4 \frac{\sum_{i=1}^{n}(DLRSSINR(i) \geq \text{Thresh}_{DLRSSINR})}{n} \quad \text{Formula 2}$$

where n is a quantity of pieces of the acquired measurement information of the optimized area; i=1, 2, . . . , n, where i is an integer; DLRSRP(i) and DLRSSINR(i) are the estimated value of the RSRP and the estimated value of the SINR, respectively; $\text{Thresh}_{DLRSRP}$ and $\text{Thresh}_{DLRSSINR}$ are an RSRP threshold and an SINR threshold, respectively; k3 and k4 are a proportion of the RSRP and a proportion of the SINR, respectively, and k3+k4=1; when DLRSRP(i) ≥$\text{Thresh}_{DLRSRP}$, (DLRSRP(i)≥$\text{Thresh}_{DLRSRP}$) is 1, and otherwise, (DLRSRP(i)≥$\text{Thresh}_{DLRSRP}$) is 0; and F1 is the coverage counter.

To resolve the foregoing technical problem, according to a third aspect of the present invention, a controller is provided, where the controller may be a computation-capable host server, personal computer (PC), or portable computer or terminal, or the like.

The controller includes a processor, a communications interface, a memory, and a bus. The processor, the communications interface, and the memory communicate with each other by using the bus.

The communications interface is configured to communicate with a network element, where the network element includes, for example, a virtual machine management center and a shared memory.

The processor is configured to execute a program. The processor may be a central processing unit (CPU), an application-specific integrated circuit (ASIC), or one or more integrated circuits that are configured to implement an embodiment of the present invention.

The memory is configured to store a file. The memory may include a high-speed RAM memory, and may further include a non-volatile memory, for example, at least one disk memory. The memory may also be a memory array. The memory may also be divided into blocks, and the blocks may be combined into a virtual volume according to a rule.

In a possible implementation manner, the memory stores program code that includes a computer operation instruction, and the processor invokes the program code stored in the memory to perform the following steps:

when load of an active antenna system (AAS) cell is greater than or equal to a load threshold, if a cell in an optimized area is not overloaded, load of a first cell is less than the load of the AAS cell, and load of a second cell is less than the load of the AAS cell, acquire a first antenna parameter combination corresponding to a maximum capacity of the optimized area, where the first cell and the second cell are two cells obtained after the AAS cell is pre-split, the optimized area is the AAS cell, or is the AAS cell and at least one neighboring cell of the AAS cell, and the first antenna parameter combination includes a first antenna parameter of the first cell and a second antenna parameter of the second cell, where: the first antenna parameter includes a downtilt of a first antenna and a transmit power of the first antenna, and the second antenna parameter includes a downtilt of a second antenna and a transmit power of the second antenna; and split an AAS antenna according to the first antenna parameter combination.

With reference to the third aspect, in a first possible implementation manner, the acquiring a first antenna parameter combination corresponding to a maximum capacity of the optimized area includes:

acquiring measurement information that is collected by user equipment in the optimized area within a preset duration;

performing estimation on the basis of the measurement information by using multiple antenna parameter combinations, to obtain an estimated value that is of the measurement information and corresponding to each antenna parameter combination of the multiple antenna parameter combinations;

calculating, according to the estimated value of the measurement information, a capacity that is of the optimized area and corresponding to each antenna parameter combination; and acquiring, according to the capacity that is of the optimized area and corresponding to each antenna parameter combination, the first antenna parameter combination corresponding to the maximum capacity of the optimized area.

With reference to the first possible implementation manner of the third aspect, in a second possible implementation manner, the measurement information includes a signal to interference plus noise ratio (SINR) and a throughput that are of the user equipment; and the performing estimation on the basis of the measurement information by using multiple antenna parameter combinations, to obtain an estimated value that is of the measurement information and corresponding to each antenna parameter combination of the multiple antenna parameter combinations specifically includes:

performing estimation on the basis of the SINR and the throughput by using the multiple antenna parameter combinations, to obtain an estimated value of the SINR and an estimated value of the throughput that are corresponding to each antenna combination of the multiple antenna parameter combinations.

With reference to the second possible implementation manner of the third aspect, in a third possible implementation manner, the calculating, according to the estimated value of the measurement information, a capacity that is of the optimized area and corresponding to each antenna parameter combination specifically includes:

calculating, according to the estimated value of the SINR and the estimated value of the throughput, a resource block (RB) usage and a load difference rate that are of the optimized area and corresponding to each antenna parameter combination; and calculating, according to the resource block (RB) usage and the load difference rate, the capacity that is of the optimized area and corresponding to each antenna parameter combination.

With reference to the third aspect, in a fourth possible implementation manner, the acquiring a first antenna parameter combination corresponding to a maximum capacity of the optimized area further includes:

a coverage counter that is of the optimized area and corresponding to the first antenna parameter combination is greater than or equal to a coverage counter threshold.

With reference to the fourth possible implementation manner of the third aspect, in a fifth possible implementation manner, the acquiring a first antenna parameter combination corresponding to a maximum capacity of the optimized area includes:

acquiring multiple antenna parameter combinations that meet a coverage condition, where the coverage condition refers to that the coverage counter of the optimized area is greater than or equal to the coverage counter threshold; and calculating the capacity that is of the optimized area and corresponding to the multiple antenna parameter combinations that meet the coverage condition, to acquire the first antenna parameter combination corresponding to the maximum capacity.

With reference to the fifth possible implementation manner of the third aspect, in a sixth possible implementation manner, the acquiring antenna parameter combinations that meet a coverage condition includes:

acquiring measurement information that is collected by user equipment in the optimized area within a preset duration;

performing estimation on the basis of the measurement information by using multiple antenna parameter combinations, to obtain an estimated value that is of the measurement information and corresponding to each antenna parameter combination of the multiple antenna parameter combinations;

calculating, according to the estimated value of the measurement information, a coverage counter that is of the optimized area and corresponding to each antenna parameter combination; and comparing calculated coverage counters corresponding to all the antenna parameter combinations with the coverage counter threshold, to acquire the multiple antenna parameter combinations that meet the coverage condition.

With reference to the sixth possible implementation manner of the third aspect, in a seventh possible implementation manner, the measurement information includes an SINR and a reference signal received power (RSRP) that are of the user equipment; and the performing estimation on the basis of the measurement information by using multiple antenna parameter combinations, to obtain an estimated value that is of the measurement information and corresponding to each antenna parameter combination of the multiple antenna parameter combinations specifically includes:

performing estimation on the basis of the SINR and the RSRP by using the multiple antenna parameter combinations, to obtain an estimated value of the SINR and an estimated value of the RSRP that are corresponding to each antenna parameter combination of the multiple antenna parameter combinations; and the calculating, according to the estimated value of the measurement information, the coverage counter that is of the optimized area and corresponding to each antenna parameter combination specifically includes:

calculating, according to the estimated value of the SINR and the estimated value of the RSRP, the coverage counter that is of the optimized area and corresponding to each antenna parameter combination.

With reference to the seventh possible implementation manner of the third aspect, in an eighth possible implementation manner, the measurement information further includes a throughput of the user equipment; and the performing estimation on the basis of the measurement information by using multiple antenna parameter combinations, to obtain an estimated value that is of the measurement information and corresponding to each antenna parameter combination of the multiple antenna parameter combinations specifically further includes:

performing estimation on the basis of the throughput by using the multiple antenna parameter combinations, to obtain an estimated value that is of the throughput and corresponding to each antenna parameter combination of the multiple antenna parameter combinations; and the calculating the capacity that is of the optimized area and corresponding to the multiple antenna parameter combinations that meet the coverage condition, to acquire the first antenna parameter combination corresponding to the maximum capacity specifically includes:

calculating, according to the estimated value of the SINR and the estimated value of the throughput, a resource block (RB) usage and a load difference rate that are of the optimized area and corresponding to each antenna parameter combination that meets the coverage condition; and calculating, according to the RB usage and the load difference rate, the capacity that is of the optimized area and corresponding to each antenna parameter combination that meets the coverage condition, to acquire an antenna parameter combination corresponding to the maximum capacity.

With reference to the fourth possible implementation manner of the third aspect, in a ninth possible implementation manner, the acquiring a first antenna parameter combination corresponding to a maximum capacity of the optimized area includes:

acquiring measurement information that is collected by user equipment in the optimized area within a preset duration;

performing estimation on the basis of the measurement information by using multiple antenna parameter combinations, to obtain an estimated value that is of the measurement information and corresponding to each antenna parameter combination of the multiple antenna parameter combinations;

calculating, according to the estimated value of the measurement information, a capacity that is of the optimized area and corresponding to each antenna parameter combination; and acquiring, according to the calculated capacity that is of the optimized area and corresponding to each antenna parameter combination, the first antenna parameter combination that is of antenna parameter combinations meeting the coverage condition and that is corresponding to a maximum capacity of the optimized area, where the coverage condition refers to that the coverage counter of the optimized area is greater than or equal to the coverage counter threshold.

With reference to the third aspect and any one of the possible implementation manners of the third aspect, in a tenth possible implementation manner, the capacity counter of the optimized area is obtained by using Formula 1:

$$G1 = k1*p + k2*q \qquad \text{Formula 1}$$

where p is the RB usage of the optimized area; q is the load difference rate of the optimized area; k1 and k2 are a proportion of the RB usage of the optimized area and a proportion of the load difference rate of the optimized area, respectively, and k1+k2=1; and G1 is the capacity counter, where a smaller capacity counter indicates a larger capacity.

With reference to any one of the fourth to the tenth possible implementation manners of the third aspect, in an eleventh possible implementation manner, Formula 2 is used as a formula for calculating the coverage counter:

$$F1 = k3 \frac{\sum_{i=1}^{n}(DLRSRP(i) \geq \text{Thresh}_{DLRSRP})}{n} + k4 \frac{\sum_{i=1}^{n}(DLRSSINR(i) \geq \text{Thresh}_{DLRSSINR})}{n} \qquad \text{Formula 2}$$

where n is a quantity of pieces of the acquired measurement information of the optimized area; i=1, 2, ..., n, where i is an integer; DLRSRP(i) and DLRSSINR(i) are the estimated value of the RSRP and the estimated value of the SINR, respectively; $\text{Thresh}_{DLRSRP}$ and $\text{Thresh}_{DLRSSINR}$ are an RSRP threshold and an SINR threshold, respectively; k3 and k4 are a proportion of the RSRP and a proportion of the SINR, respectively, and k3+k4=1; when DLRSRP(i) ≥$\text{Thresh}_{DLRSRP}$, (DLRSRP(i)≥$\text{Thresh}_{DLRSRP}$) is 1, and otherwise, (DLRSRP(i)≥$\text{Thresh}_{DLRSRP}$) is 0; and F1 is the coverage counter.

According to the antenna splitting method in an active antenna system and the controller that are provided in the embodiments of the present invention, load of a cell in an optimized area after an AAS antenna parameter is adjusted can be estimated according to a gain of the antenna parameter; when the cell in the optimized area is not overloaded, and loads of two cells obtained after an AAS cell is split are less than load of the AAS cell before the AAS cell is split, the controller can re-calculate a capacity of the optimized area; all calculated capacity values are compared to acquire an antenna parameter combination corresponding to a maximum capacity; and finally, the controller can split, according to a beam corresponding to the antenna parameter combination, an AAS antenna corresponding to a heavily loaded AAS cell. The antenna splitting method in an active antenna system according to the embodiments of the present invention can effectively reduce the load of the heavily loaded AAS cell, and effectively increase a capacity of the optimized area.

Other features and aspects of the present invention will become more clear from the following detailed descriptions of exemplary embodiments with reference to accompanying drawings.

BRIEF DESCRIPTION OF THE DRAWINGS

Accompanying drawings that are included in the specification and serve as a part of the specification, together with the specification, illustrate exemplary embodiments, features, and aspects of the present invention, and are used to explain principles of the present invention.

DETAILED DESCRIPTION OF ILLUSTRATIVE EMBODIMENTS

Figure 1:
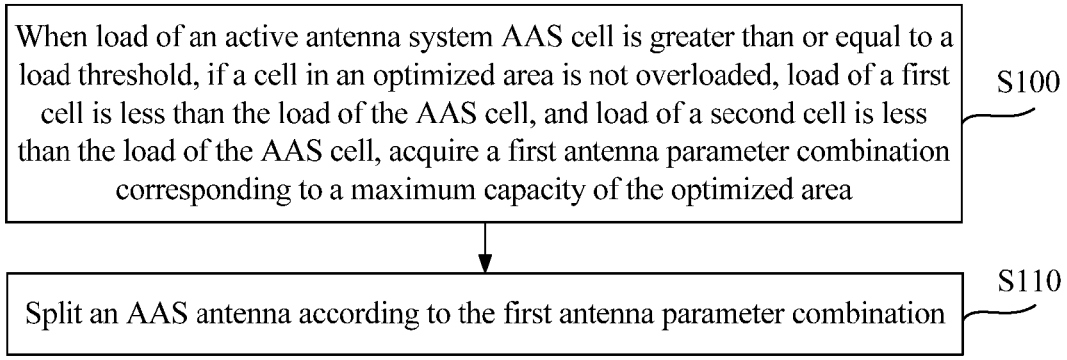
FIG. 1 is a flowchart of an antenna splitting method in an active antenna system according to an embodiment of the present invention.

Various exemplary embodiments, features, and aspects of the present invention are described below in detail with reference to accompanying drawings. Same reference numerals in the accompanying drawings represent elements with a same or similar function. Though various aspects of the embodiments are illustrated in the accompanying drawings, unless otherwise specified, the accompanying drawings are not necessarily drawn to scale.

The term "exemplary" herein means "being used as an example or an embodiment, or being illustrative." Any embodiment described as "exemplary" does not need to be explained to be preferable over or better than another embodiment.

In addition, for a better description of the present invention, many details are given in specific embodiments below. A person skilled in the art should understand that the present invention can still be implemented without these specific details. In some other examples, well-known methods, means, elements, and circuits are not described in detail, so as to highlight the subject matter of the present invention.

An AAS antenna may be split in multiple manners, for example, vertical splitting and horizontal splitting. Vertical splitting of an AAS antenna mainly refers to that beamforming is implemented on a vertical plane of the AAS antenna, so that two beams covering different areas are formed on the vertical plane of the AAS antenna, and one cell is split into two cells. In this case, the two cells have a same frequency channel number, but the AAS antenna uses different downtilts to cover a near site and a far site.

With the technology of vertical splitting of an AAS antenna, one cell is split into two cells, which doubles a spectrum resource and may increase a capacity. However, after one cell is split into two cells, because interference increases, and power may decrease by half (coverage becomes poorer), spectrum efficiency may decrease significantly. Therefore, if improper splitting is selected, a total capacity of the two cells obtained after the splitting may be less than the original capacity of the one cell. Therefore, the problem that needs to be resolved by this application is how to select a proper AAS antenna beam to split an AAS cell so as to effectively increase a capacity of the AAS cell.

Embodiment 1

FIG. 1 is a flowchart of an antenna splitting method in an active antenna system according to an embodiment of the present invention. As shown in FIG. 1, the method may mainly include the following steps:

Step S100. When load of an active antenna system (AAS) cell is greater than or equal to a load threshold, if a cell in an optimized area is not overloaded, load of a first cell is less than the load of the AAS cell, and load of a second cell is less than the load of the AAS cell, acquire a first antenna parameter combination corresponding to a maximum capacity of the optimized area.

The first cell and the second cell are two cells obtained after the AAS cell is pre-split, the optimized area is the AAS cell, or is the AAS cell and at least one neighboring cell of the AAS cell, and the first antenna parameter combination includes a first antenna parameter of the first cell and a second antenna parameter of the second cell, where: the first antenna parameter includes a downtilt of a first antenna and a transmit power of the first antenna, and the second antenna parameter includes a downtilt of a second antenna and a transmit power of the second antenna.

Step S110. Split an AAS antenna according to the acquired first antenna parameter combination.

Specifically, a control center (hereinafter referred to as a controller) for AAS cells sets a threshold for load of each AAS cell, where the threshold is a maximum limit for load of an AAS cell. When load of an AAS cell exceeds the threshold, user experience of the AAS cell will be significantly degraded. In this case, the AAS cell needs to be split to reduce the load of the AAS cell.

When the controller detects that load of an AAS cell (hereinafter referred to as a first AAS cell) exceeds a load threshold set by the controller, that is, the AAS cell is heavily loaded, the controller may estimate, on the basis of an antenna gain corresponding to an antenna parameter, a capacity of the AAS cell obtained after the AAS antenna parameter is adjusted. For example, it is assumed that the AAS antenna is adjusted, and the AAS cell is split into two cells: the first cell and the second cell. The first cell is corresponding to the first antenna parameter, and the second cell is corresponding to the second antenna parameter. The first antenna parameter includes a downtilt of a first antenna and a transmit power of the first antenna, and the second antenna parameter includes a downtilt of a second antenna and a transmit power of the second antenna. The first antenna parameter and the second antenna parameter form the antenna parameter combination obtained after the AAS cell is split. It is assumed that the controller splits, according to an antenna parameter combination, an AAS antenna corresponding to the heavily loaded AAS cell. The controller can estimate the load of each cell in the optimized area according to an antenna gain that is of the AAS antenna before the AAS antenna is split and that is relative to an antenna gain corresponding to the antenna parameter combination. In this application, the optimized area may be an AAS cell, or may be an AAS cell and a neighboring cell of the AAS cell. If the load of each cell in the optimized area is not greater than a bandwidth of the cell (the cell is not overloaded), and the loads of the first cell and the second cell that are obtained after the AAS cell is split are less than load of the AAS cell before the AAS cell is split, the controller can calculate a capacity of the optimized area, that is, the controller can obtain the capacity that is of the optimized area and corresponding to the antenna parameter combination.

When another antenna parameter combination is used, if the cell that is in the optimized area and corresponding to the antenna parameter combination is not overloaded, and the loads of the first cell and the second cell that are obtained after the AAS cell is split are less than the load of the AAS cell before the AAS cell is split, the controller can still calculate a capacity of the optimized area, that is, the controller can still obtain the capacity that is of the optimized area and corresponding to the antenna parameter combination.

All calculated capacity values of the optimized area are compared to acquire an antenna parameter combination corresponding to a maximum capacity, that is, a first antenna parameter combination. In a possible implementation manner, when an antenna parameter combination corresponding to a maximum capacity value is being acquired, acquiring a coverage counter that is of the optimized area and corresponding to the antenna combination may also be included, and an acquired coverage counter corresponding to the first antenna combination should also meet a coverage condition, where the coverage condition refers to that the coverage counter of the optimized area is greater than or equal to a coverage counter threshold.

Finally, the controller can split, according to a beam corresponding to the first antenna parameter combination, an AAS antenna corresponding to the heavily loaded AAS cell.

In the antenna splitting method in an active antenna system according to this embodiment of the present invention, load of a cell in an optimized area after an AAS antenna parameter is adjusted can be estimated according to a gain of the antenna parameter; when the cell in the optimized area is not overloaded, and loads of two cells obtained after an AAS cell is split are less than load of the AAS cell before the AAS cell is split, the controller can re-calculate a capacity of the optimized area; all calculated capacity values are compared to acquire an antenna parameter combination corresponding to a maximum capacity; and finally, the controller can split, according to a beam corresponding to the antenna parameter combination, an AAS antenna corresponding to a heavily loaded AAS cell. The antenna splitting method in an active antenna system according to this embodiment of the present invention can effectively reduce the load of the heavily loaded AAS cell, and effectively increase a capacity of the optimized area.

Embodiment 2

Figure 2:
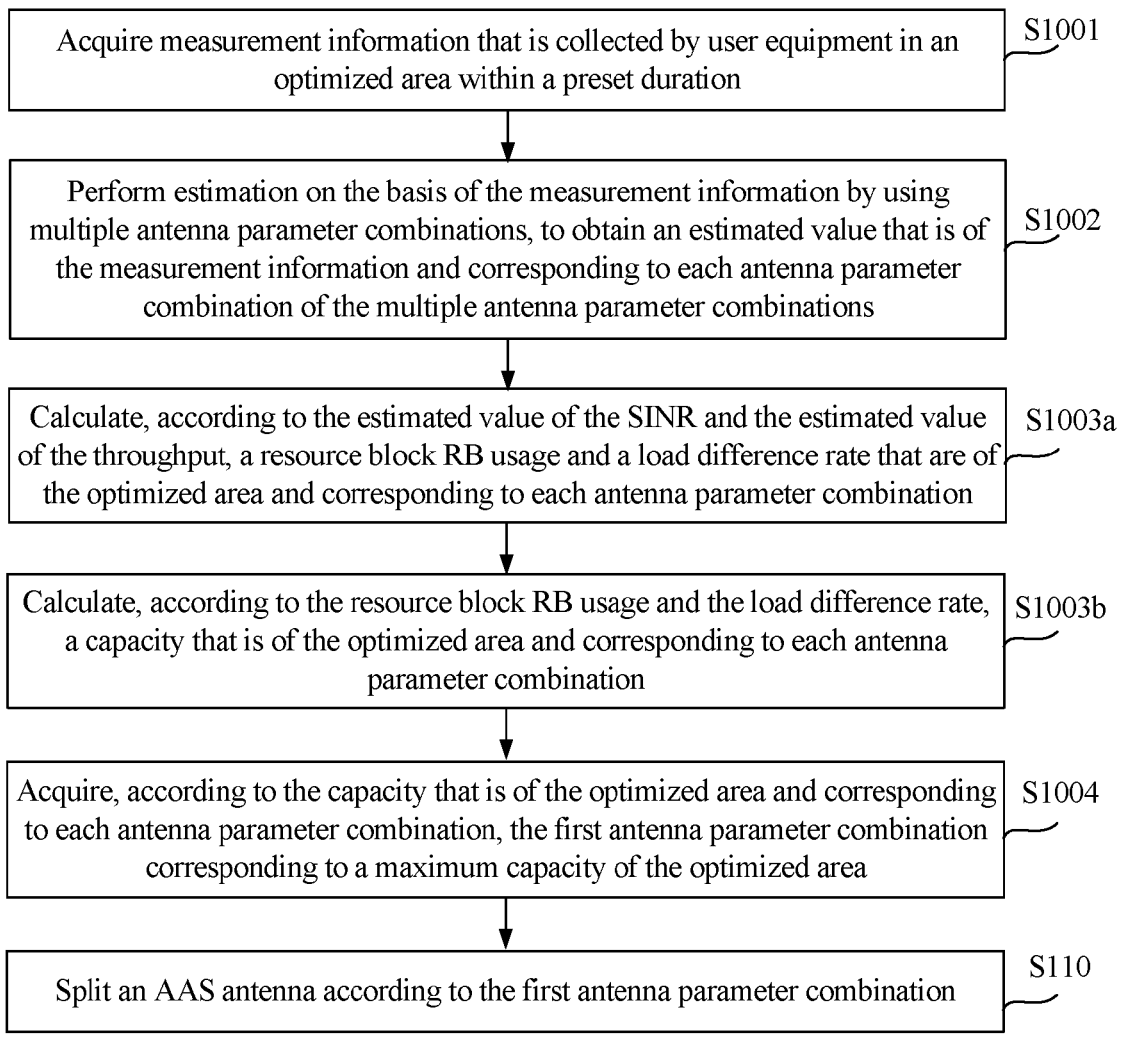
FIG. 2 is a flowchart of an antenna splitting method in an active antenna system according to another embodiment of the present invention.

FIG. 2 is a flowchart of an antenna splitting method in an active antenna system according to another embodiment of the present invention. Steps with same reference numerals in FIG. 2 and FIG. 1 provide same functions. For brevity, detailed descriptions of these steps are omitted.

As shown in FIG. 2, a main difference between this embodiment and the foregoing embodiment lies in that the foregoing step S100 may mainly include the following steps:

Step S1001. Acquire measurement information that is collected by user equipment in an optimized area within a preset duration.

Step S1002. Perform estimation on the basis of the measurement information by using multiple antenna parameter combinations, to obtain an estimated value that is of the measurement information and corresponding to each antenna parameter combination of the multiple antenna parameter combinations.

Step S1003. Calculate, according to the estimated value of the measurement information, a capacity that is of the optimized area and corresponding to each antenna parameter combination.

Step S1004. Acquire, according to the capacity that is of the optimized area and corresponding to each antenna parameter combination, the first antenna parameter combination corresponding to a maximum capacity of the optimized area.

For the foregoing step S1001, in a possible implementation manner, when detecting that an AAS cell is heavily loaded, a controller can trigger user equipment in an optimized area corresponding to the AAS cell to collect data within a preset duration. A manner of collecting data generally includes reporting measurement information by means of an minimization drive test (MDT) or a drive test (DT).

In a possible implementation manner, the foregoing measurement information may mainly include a signal to interference plus noise ratio (SINR) and a throughput that are of the user equipment. The foregoing measurement information is real data that is of the user equipment in the optimized area and collected before the heavily loaded AAS cell is split.

For the foregoing step S1002, the controller can adjust an antenna parameter of the AAS cell. For different schemes for adjusting AAS antenna parameters, different antenna parameter combinations can be obtained. For details about the antenna parameter and the antenna parameter combinations, reference may be made to detailed descriptions of the foregoing embodiment. After acquiring measurement information reported by the user equipment, the controller can perform estimation on the basis of the foregoing measurement information according to an antenna gain corresponding to each antenna parameter combination, to obtain an estimated value that is of the measurement information and corresponding to each antenna parameter combination. When the foregoing measurement information mainly includes the SINR and throughput of the user equipment, obtained estimated values that are of the measurement information and corresponding to each antenna parameter combination are specifically an estimated value of the SINR and an estimated value of the throughput.

For step S1003, after the estimated value that is of the measurement information and corresponding to each antenna parameter combination is obtained, the capacity that is of the optimized area and corresponding to each antenna parameter combination can be calculated.

In a possible implementation manner, the foregoing step S1003 may include the following steps:

Step S1003a. Calculate, according to the estimated value of the SINR and the estimated value of the throughput, a resource block (RB) usage and a load difference rate that are of the optimized area and corresponding to each antenna parameter combination.

Step S1003b. Calculate, according to the resource block (RB) usage and the load difference rate, the capacity that is of the optimized area and corresponding to each antenna parameter combination.

For the foregoing step S1003a, a quantity of RBs that are required by the user equipment is a ratio of the throughput of the user equipment to a transmission efficiency corresponding to the SINR of the user equipment, and a quantity of RBs required in a cell is a sum of RBs required by all user equipment in the cell. Therefore, after the controller obtains the estimated values that are of the SINR and the throughput and corresponding to an antenna parameter combination, a quantity of RBs required by the user equipment in the antenna parameter combination can be obtained based on a ratio of the estimated value of the throughput of the user equipment to a transmission efficiency corresponding to the estimated value of the SINR of the user equipment, and therefore a quantity of RBs required by the cell is obtained. The RB usage of the optimized area can be obtained by dividing a sum of RBs required by all cells in the optimized area by a sum of RBs corresponding to bandwidth of all the cells in the optimized area.

An average quantity of RBs required by all the cells in the optimized area can be obtained by dividing the sum of RBs required by all the cells in the optimized area by a total quantity of the cells in the optimized area, and a load difference rate of a cell may be expressed as an absolute value of a difference between the quantity of RBs required by the cell and an estimated value of the average quantity of the RBs required by all the cells in the optimized area. Therefore, a load difference rate of the optimized area can be calculated by dividing a sum of load difference rates of all the cells in the optimized area by a total quantity of the cells in the optimized area.

For the foregoing step S1003b, in a possible implementation manner, a capacity counter of the optimized area can be calculated by using Formula 1 according to the obtained RB usage and a load difference rate of the optimized area.

$$G1 = k1*p + k2*q \qquad \text{Formula 1}$$

where p is the RB usage of the optimized area; q is the load difference rate of the optimized area; k1 and k2 are a proportion of the RB usage of the optimized area and a proportion of the load difference rate of the optimized area, respectively, which are set by the controller, and k1+k2=1; and G1 is the capacity counter and indicates a function value of Formula 1, where a smaller capacity counter of the optimized area indicates a larger capacity of the optimized area.

For another antenna parameter combination, a capacity counter that is of an optimized area and corresponding to each antenna parameter combination can be obtained by using the foregoing method and formula, and therefore a capacity that is of an optimized area and corresponding to each antenna parameter combination can be obtained.

For the foregoing step S1004, the antenna parameter combination corresponding to a minimum capacity counter, that is, the antenna parameter combination corresponding to a maximum capacity, can be acquired by comparing capacity counters that are corresponding to all antenna parameter combinations and calculated in the foregoing step S1003.

Finally, after the antenna parameter combination corresponding to the maximum capacity is acquired, the controller can split an AAS antenna in the heavily loaded AAS cell according to the antenna parameter combination, that is, a beam corresponding to the first antenna parameter combination.

In the antenna splitting method in an active antenna system according to this embodiment of the present invention, load of a cell in an optimized area after an AAS antenna parameter is adjusted can be estimated according to a gain of the antenna parameter; when the cell in the optimized area is not overloaded, and loads of two cells obtained after an AAS cell is split are less than load of the AAS cell before the AAS cell is split, the controller can re-calculate a capacity of the optimized area; all calculated capacity values are compared to acquire an antenna parameter combination corresponding to a maximum capacity; and finally, the controller can split, according to a beam corresponding to the antenna parameter combination, an AAS antenna corresponding to a heavily loaded AAS cell. The antenna splitting method in an active antenna system according to this embodiment of the present invention can effectively reduce the load of the heavily loaded AAS cell, and effectively increase a capacity of the optimized area.

Embodiment 3

Figure 3:
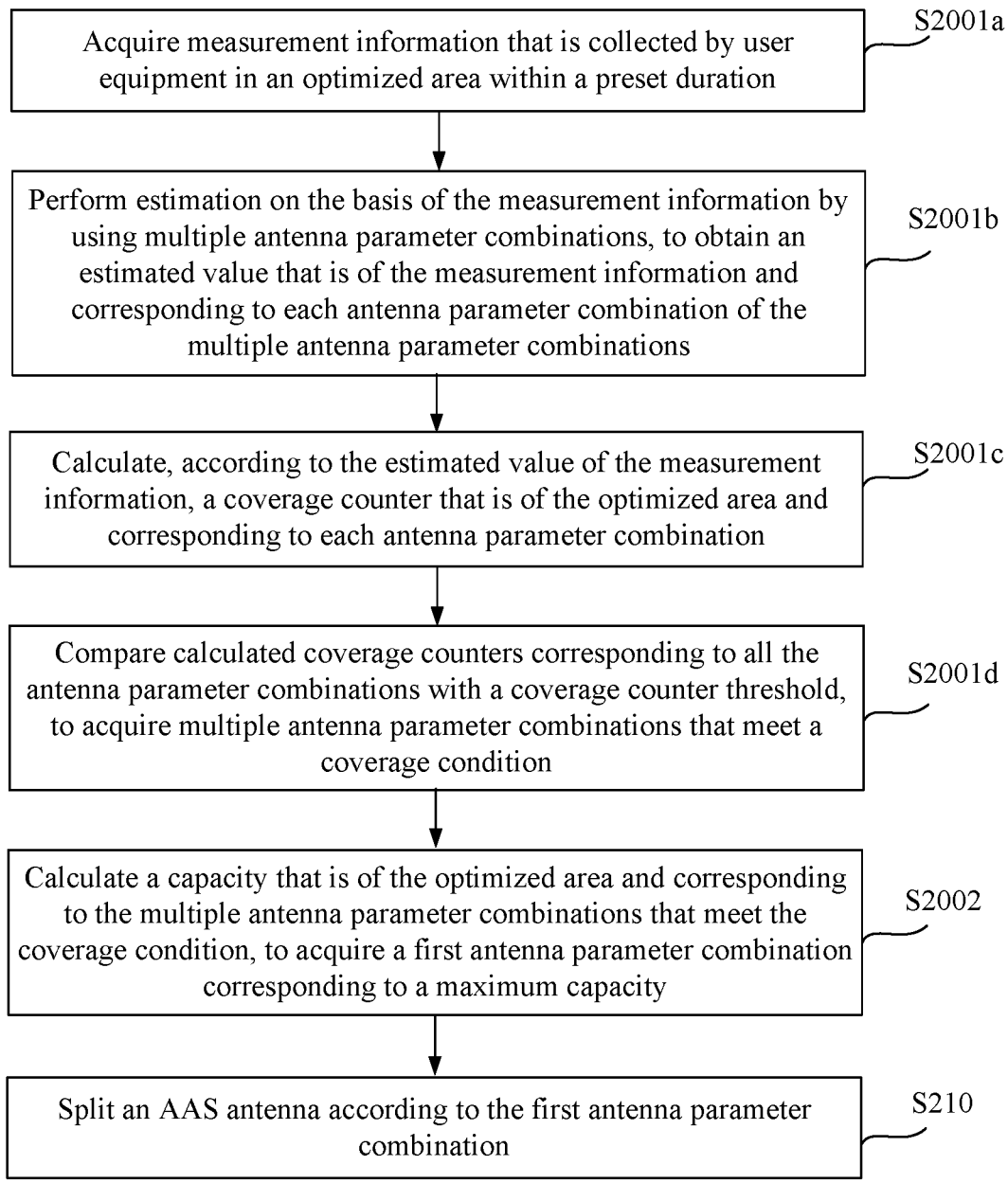
FIG. 3 is a flowchart of an antenna splitting method in an active antenna system according to still another embodiment of the present invention.

FIG. 3 is a flowchart of an antenna splitting method in an active antenna system according to still another embodiment of the present invention. The antenna splitting method in an active antenna system according to this embodiment may mainly include the following steps:

Step S200. When load of an active antenna system (AAS) cell is greater than or equal to a load threshold, if a cell in an optimized area is not overloaded, load of a first cell is less than the load of the AAS cell, and load of a second cell is less than the load of the AAS cell, acquire a first antenna parameter combination corresponding to a maximum capacity of the optimized area.

The first cell and the second cell are two cells obtained after the AAS cell is pre-split, the optimized area is the AAS cell, or is the AAS cell and at least one neighboring cell of the AAS cell, and the first antenna parameter combination includes a first antenna parameter of the first cell and a second antenna parameter of the second cell, where: the first antenna parameter includes a downtilt of a first antenna and a transmit power of the first antenna, and the second antenna parameter includes a downtilt of a second antenna and a transmit power of the second antenna.

Step S210. Split an AAS antenna according to the first antenna parameter combination.

In a possible implementation manner, the first antenna combination that is corresponding to the maximum capacity and acquired in step 200 can further meet a coverage condition, where the coverage condition refers to that a coverage counter of the optimized area is greater than or equal to a coverage counter threshold.

In a possible implementation manner, the foregoing step S200 may include the following steps:

Step S2001. Acquire multiple antenna parameter combinations that meet a coverage condition, where the coverage condition refers to that the coverage counter of the optimized area is greater than or equal to the coverage counter threshold.

Step S2002. Calculate a capacity that is of the optimized area and corresponding to the multiple antenna parameter combinations that meet the coverage condition, to acquire the first antenna parameter combination corresponding to the maximum capacity.

For the foregoing step S2001, because the coverage counter of the AAS cell is a most basic counter, if coverage is poor after the AAS antenna in the AAS cell is adjusted, it is very likely that a complaint will be received from a user of the AAS cell. Therefore, the controller may first calculate the coverage counter of the optimized area to acquire an antenna parameter combination that meets the coverage condition, where the coverage condition refers to that the coverage counter of the optimized area is greater than or equal to the coverage counter threshold, where the coverage counter threshold is set by the controller. The controller considers whether to split an antenna of the AAS cell according to a beam corresponding to the antenna parameter combination only when the calculated coverage counter of the optimized area is greater than or equal to the set coverage counter threshold.

For the foregoing step S2002, it is not necessary to calculate capacities corresponding to all antenna parameter combinations, and it is only necessary to calculate the capacity corresponding to the antenna parameter combination that meets the coverage condition. For the antenna parameter combination that meets the coverage condition and calculated in step S2001, the controller directly calculates the capacities corresponding to the antenna parameter combinations that meet the coverage condition, to acquire the antenna parameter combination corresponding to the maximum capacity.

In a possible implementation manner, the foregoing step S2001 may include the following steps:

Step S2001a. Acquire measurement information that is collected by user equipment in the optimized area within a preset duration.

Step S2001b. Perform estimation on the basis of the measurement information by using multiple antenna parameter combinations, to obtain an estimated value that is of the measurement information and corresponding to each antenna parameter combination of the multiple antenna parameter combinations.

Step S2001c. Calculate, according to the estimated value of the measurement information, a coverage counter that is of the optimized area and corresponding to each antenna parameter combination; and Step S2001d. Compare calculated coverage counters corresponding to all the antenna parameter combinations with the coverage counter threshold, to acquire the multiple antenna parameter combinations that meet the coverage condition.

For the foregoing steps S2001a and S2001b, the measurement information of the user equipment can be acquired and estimated by respectively using the method in step S1001 and in step S1002 that are in the foregoing embodiment, so as to obtain the estimated value of the measurement information. In a possible implementation manner, the measurement information acquired in the foregoing step S2001a may include an SINR and an reference signal received power (RSRP) that are of the user equipment; in the foregoing step S2001b, specifically, the SINR and the RSRP can be estimated by using multiple antenna parameter combinations, to obtain the estimated value of the SINR and the estimated value of the RSRP.

For the foregoing step S2001c, in a possible implementation manner, specifically, the coverage counter that is of the optimized area and corresponding to each antenna parameter combination can be calculated according to the estimated value of the RSRP and the estimated value of the SINR.

In a possible implementation manner, Formula 2 is used as a formula for calculating the coverage counter:

$$F1 = k3 \frac{\sum_{i=1}^{n}(DLRSRP(i) \geq \text{Thresh}_{DLRSRP})}{n} + k4 \frac{\sum_{i=1}^{n}(DLRSSINR(i) \geq \text{Thresh}_{DLRSSINR})}{n} \quad \text{Formula 2}$$

where n is a quantity of pieces of the acquired measurement information of the optimized area; i=1, 2, ..., n, where i is an integer; DLRSRP(i) and DLRSSINR(i) are the estimated value of the RSRP and the estimated value of the SINR, respectively; $\text{Thresh}_{DLRSRP}$ and $\text{Thresh}_{DLRSSINR}$ are an RSRP threshold and an SINR threshold, respectively, which are set by the controller; k3 and k4 are a proportion of the RSRP and a proportion of the SINR, respectively, which are set by the controller, and k3+k4=1; when DLRSRP(i)≥$\text{Thresh}_{DLRSRP}$ (DLRSRP(i)≥$\text{Thresh}_{DLRSRP}$) is 1, and otherwise, (DLRSRP(i)≥$\text{Thresh}_{DLRSRP}$ is 0; and F1 is the coverage counter.

The coverage counter that is of the optimized area and corresponding to each antenna parameter combination can be calculated by using the foregoing Formula 2.

For the foregoing step S2001d, the coverage counter that is corresponding to each of all the antenna parameter combinations and calculated by using Formula 2 can be compared with the coverage counter threshold, to acquire the antenna parameter combination that meets the coverage condition, that is, to acquire the antenna parameter combination when the coverage counter of the optimized area is greater than or equal to the coverage counter threshold.

In a possible implementation manner, the measurement information acquired in the foregoing step S2001a may include a throughput of the user equipment; in the foregoing step S2001b, specifically, the throughput can also be estimated by using multiple antenna parameter combinations, to obtain the estimated value of the throughput. For the foregoing step S2002, specifically, a resource block (RB) usage and a load difference rate that are of the optimized area and corresponding to each antenna parameter combination that meets the coverage condition can be calculated according to the estimated value of the SINR and the estimated value of the throughput; then, the capacity corresponding to each antenna parameter combination that meets the coverage condition can be separately calculated.

For example, a capacity counter of the optimized area can be calculated by using the foregoing Formula 1, where a smaller capacity counter indicates a larger capacity. Therefore, a maximum value of the capacity counter that is of the optimized area and calculated by using Formula 1 indicates a maximum capacity value of the optimized area. An antenna parameter combination corresponding to the maximum capacity value is the first antenna parameter combination.

It should be noted that a method for acquiring the first antenna parameter combination corresponding to the maximum capacity value in the foregoing embodiment is as follows: first calculate the coverage counter that is of the optimized area and corresponding to the antenna parameter combination, and then calculate the capacity that is of the optimized area and corresponding to the antenna parameter combination that meets the coverage counter, so as to acquire the first antenna parameter combination corresponding to the maximum capacity. A person skilled in the art can easily anticipate that a method for acquiring the first antenna parameter combination corresponding to the maximum capacity value can also be as follows: first calculate the capacity that is of the optimized area and corresponding to the antenna parameter combination, and then acquire, according to the calculated capacity, the first antenna parameter combination that is of antenna parameter combinations meeting the coverage condition and that is corresponding to a maximum capacity of the optimized area. That is, in a possible implementation manner, the acquiring a first antenna parameter combination corresponding to a maximum capacity of the optimized area may mainly include: acquiring measurement information that is collected by user equipment in the optimized area within a preset duration; performing estimation on the basis of the measurement information by using multiple antenna parameter combinations, to obtain an estimated value that is of the measurement information and corresponding to each antenna parameter combination of the multiple antenna parameter combinations; calculating, according to the estimated value of the measurement information, a capacity that is of the optimized area and corresponding to each antenna parameter combination; and acquiring, according to the calculated capacity that is of the optimized area and corresponding to each antenna parameter combination, the first antenna parameter combination that is of antenna parameter combinations meeting the coverage condition and that is corresponding to a maximum capacity of the optimized area, where the coverage condition refers to that the coverage counter of the optimized area is greater than or equal to the coverage counter threshold.

Finally, the controller splits, according to a beam corresponding to the acquired antenna parameter combination that is corresponding to the maximum capacity, an AAS antenna corresponding to a heavily loaded AAS cell.

In the antenna splitting method in an active antenna system according to this embodiment of the present invention, load of a cell in an optimized area after an AAS antenna parameter is adjusted can be estimated according to a gain of the antenna parameter; when the cell in the optimized area is not overloaded, and loads of two cells obtained after an AAS cell is split are less than load of the AAS cell before the AAS cell is split, the controller may first calculate a coverage counter of the optimized area, and when the coverage counter meets a coverage condition, calculate the capacity that is of the optimized area and corresponding to the antenna parameter combination that meets the coverage condition; all calculated capacity values are compared to acquire an antenna parameter combination corresponding to a maximum capacity. The controller can also first calculate a capacity of the optimized area, and then acquire, according to the calculated capacity of the optimized area, an antenna parameter combination that is of antenna parameter combinations meeting the coverage condition and that is corresponding to a maximum capacity of the optimized area. Finally, the controller can split, according to a beam corresponding to the acquired antenna parameter combination, an AAS antenna corresponding to a heavily loaded AAS cell. In a case in which the optimized area meets the coverage condition, an antenna splitting method in an active antenna system according to this embodiment of the present invention can effectively reduce the load of the heavily loaded AAS cell, and effectively increase a capacity of the optimized area.

Embodiment 4

Figure 4:
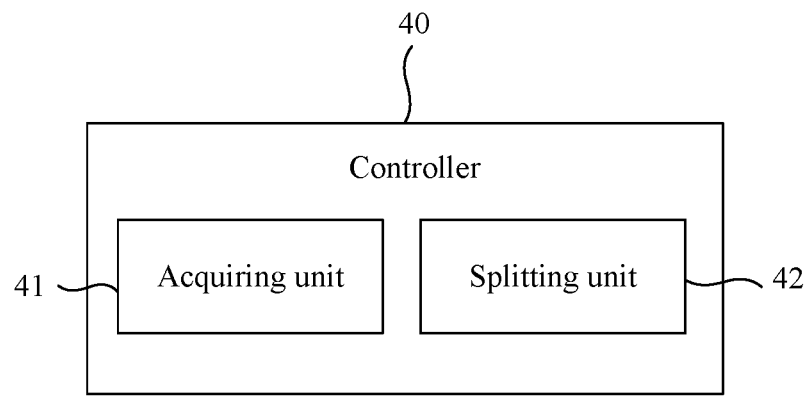
FIG. 4 is a structural block diagram of a controller according to an embodiment of the present invention.

FIG. 4 is a structural block diagram of a controller according to an embodiment of the present invention. The controller 40 is mainly applied to an active antenna system. As shown in FIG. 4, the controller may mainly include an acquiring unit 41 and a splitting module 42.

The acquiring unit 41 is mainly configured to: when load of an active antenna system (AAS) cell is greater than or equal to a load threshold, if a cell in an optimized area is not overloaded, load of a first cell is less than the load of the AAS cell, and load of a second cell is less than the load of the AAS cell, acquire a first antenna parameter combination corresponding to a maximum capacity of the optimized area, where the first cell and the second cell are two cells obtained after the AAS cell is pre-split, the optimized area is the AAS cell, or is the AAS cell and at least one neighboring cell of the AAS cell, and the first antenna parameter combination includes a first antenna parameter of the first cell and a second antenna parameter of the second cell, where: the first antenna parameter includes a downtilt of a first antenna and a transmit power of the first antenna, and the second antenna parameter includes a downtilt of a second antenna and a transmit power of the second antenna.

The splitting unit 42 is connected to the acquiring unit 41, and is mainly configured to split an AAS antenna according to the first antenna parameter combination.

The controller according to this embodiment of the present invention can be specifically configured to execute the antenna splitting method in an active antenna system in the foregoing Embodiment 1. For details about the antenna splitting method in an active antenna system in Embodiment 1, reference may be made to the foregoing embodiment.

According to the controller provided in this embodiment of the present invention, when load of an active antenna system AAS cell is greater than or equal to a load threshold, if a cell in an optimized area is not overloaded, load of a first cell is less than the load of the AAS cell, and load of a second cell is less than the load of the AAS cell, an acquiring unit may be used to acquire an antenna parameter combination corresponding to a maximum capacity of the optimized area; and a splitting unit can split the AAS antenna according to a beam corresponding to the antenna parameter combination acquired by the acquiring unit. The controller provided in this embodiment of the present invention can effectively reduce the load of a heavily loaded AAS cell, and effectively increase a capacity of the optimized area.

Embodiment 5

Figure 5:
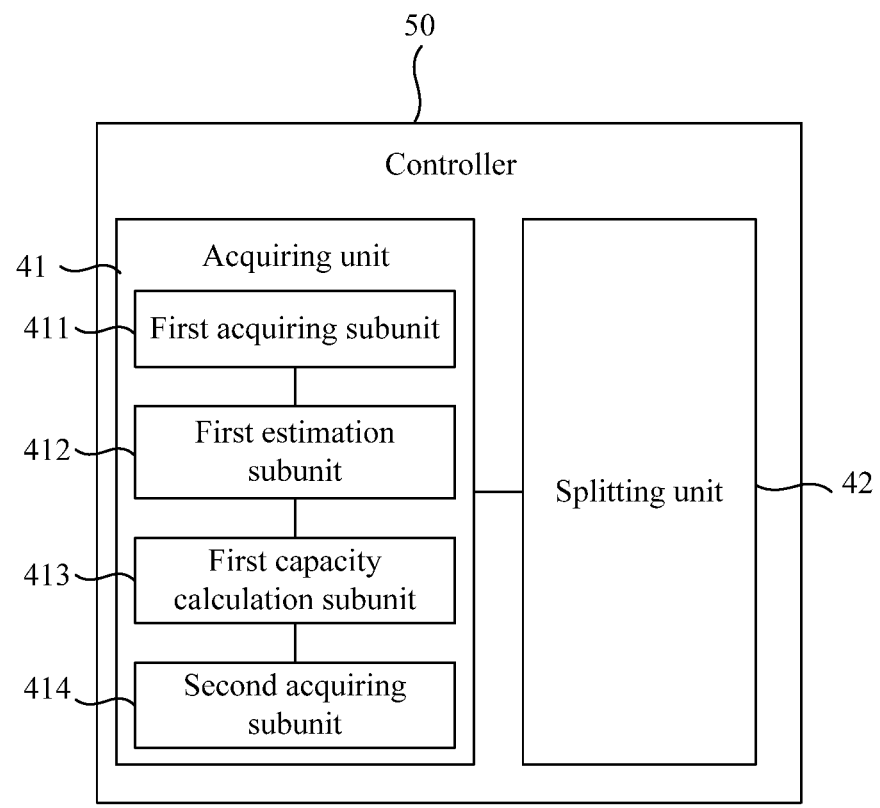
FIG. 5 is a structural block diagram of a controller according to another embodiment of the present invention.

FIG. 5 is a structural block diagram of a controller according to another embodiment of the present invention. Components with same reference numerals in FIG. 5 and FIG. 4 provide same functions. For brevity, detailed descriptions of these components are omitted.

As shown in FIG. 5, a main difference between the controller 50 in this embodiment and the controller 40 in the foregoing embodiment lies in that an acquiring unit 41 may specifically include: a first acquiring subunit 411, a first estimation subunit 412, a first capacity calculation subunit 413, and a second acquiring subunit 414.

The first acquiring subunit 411 is mainly configured to acquire measurement information that is collected by user equipment in an optimized area within a preset duration. The first estimation subunit 412 is mainly configured to perform estimation on the basis of the measurement information by using multiple antenna parameter combinations, to obtain an estimated value that is of the measurement information and corresponding to each antenna parameter combination of the multiple antenna parameter combinations. The first capacity calculation subunit 413 is mainly configured to calculate, according to the estimated value of the measurement information, a capacity that is of the optimized area and corresponding to each antenna parameter combination. The second acquiring subunit 414 is mainly configured to acquire, according to the capacity that is of the optimized area, corresponding to each antenna parameter combination, and calculated by the first capacity calculation subunit 413, the first antenna parameter combination corresponding to a maximum capacity of the optimized area.

In a possible implementation manner, the measurement information includes a signal to interference plus noise ratio SINR and a throughput that are of the user equipment; and the first estimation subunit 412 is specifically configured to perform estimation on the basis of the SINR and the throughput by using the multiple antenna parameter combinations, to obtain an estimated value of the SINR and an estimated value of the throughput that are corresponding to each antenna combination of the multiple antenna parameter combinations.

In a possible implementation manner, the first capacity calculation subunit 413 is specifically configured to calculate, according to the estimated value of the SINR and the estimated value of the throughput that are obtained by the first estimation subunit 412, a resource block (RB) usage and a load difference rate that are of the optimized area and corresponding to each antenna parameter combination; and calculate, according to the resource block (RB) usage and the load difference rate, the capacity that is of the optimized area and corresponding to each antenna parameter combination.

In a possible implementation manner, a capacity counter of the optimized area can be calculated by using Formula 1.

$$G1 = k1*p + k2*q \qquad \text{Formula 1}$$

where p is the RB usage of the optimized area; q is the load difference rate of the optimized area; k1 and k2 are a proportion of the RB usage of the optimized area and a proportion of the load difference rate of the optimized area, respectively, which are set by the controller, and $k1+k2=1$; and G1 is the capacity counter and indicates a function value of Formula 1, where a smaller capacity counter of the optimized area indicates a larger capacity of the optimized area.

The controller 50 according to this embodiment of the present invention can be specifically configured to execute the antenna splitting method in an active antenna system in the foregoing Embodiment 2. For details about the antenna splitting method in an active antenna system in Embodiment 2, reference may be made to the foregoing embodiment.

According to the controller provided in this embodiment of the present invention, when load of an active antenna system (AAS) cell is greater than or equal to a load threshold, if a cell in an optimized area is not overloaded, load of a first cell is less than the load of the AAS cell, and load of a second cell is less than the load of the AAS cell, a first acquiring subunit is configured to acquire measurement information that is collected by user equipment in the optimized area within a preset duration; a first estimation subunit is configured to perform estimation on the basis of the measurement information by using multiple antenna parameter combinations, to obtain an estimated value of the measurement information; a first capacity calculation subunit is mainly configured to calculate, according to the estimated value of the measurement information, a capacity that is of the optimized area and corresponding to each antenna parameter combination; a second acquiring subunit is mainly configured to compare the capacities that are corresponding to all the antenna parameter combinations and calculated by the first capacity calculation subunit, to acquire an antenna parameter combination that is corresponding to the maximum capacity; and a splitting unit can split the AAS antenna according to the antenna parameter combination acquired by the acquiring unit. The controller provided in this embodiment of the present invention can effectively reduce the load of a heavily loaded AAS cell, and effectively increase a capacity of the optimized area.

Embodiment 6

Figure 6:
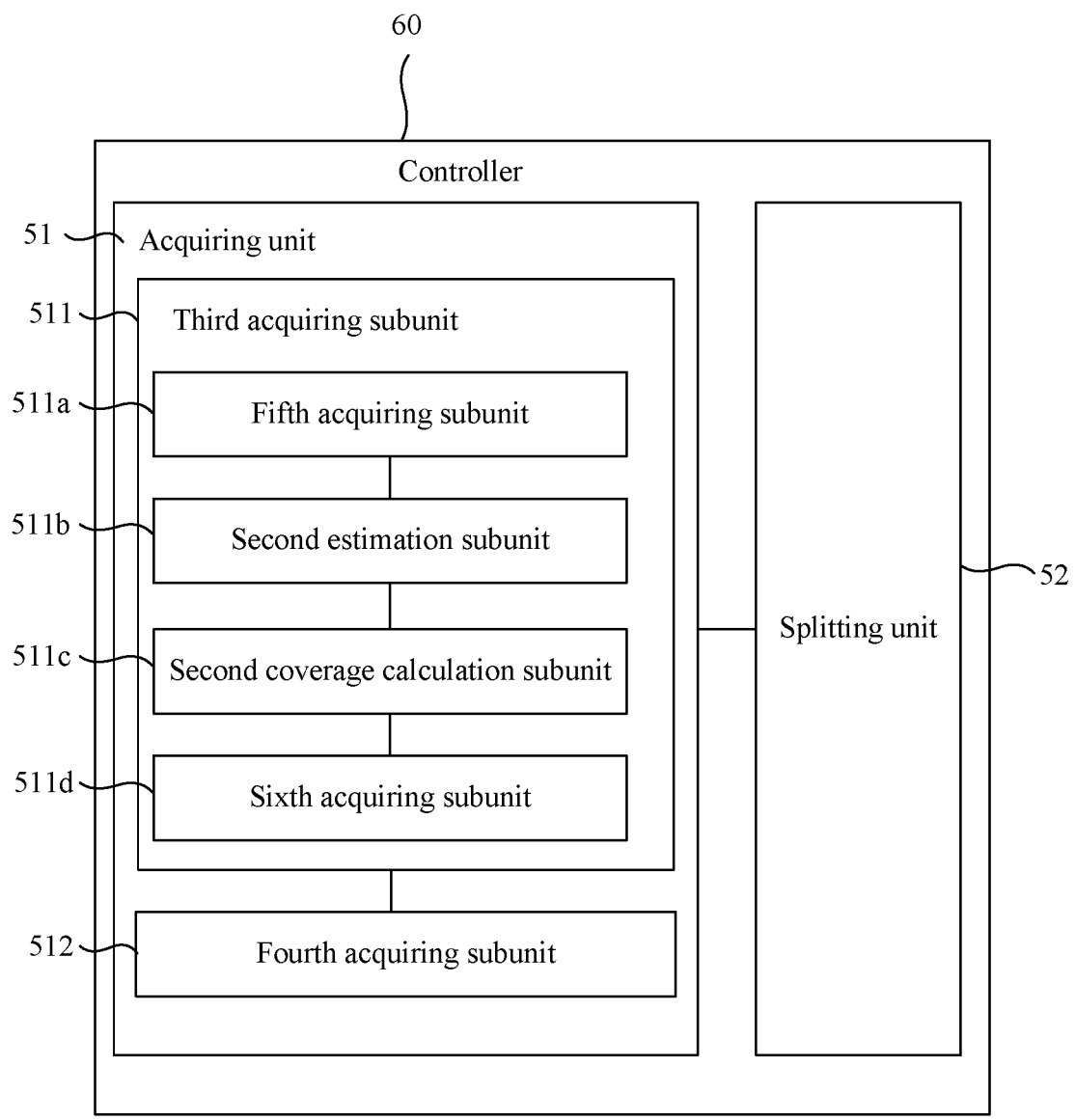
FIG. 6 is a structural block diagram of a controller according to still another embodiment of the present invention.

FIG. 6 is a structural block diagram of a controller according to still another embodiment of the present invention. As shown in FIG. 6, the controller 60 in this embodiment may mainly include: an acquiring unit 51 and a splitting unit 52.

The acquiring unit 51 is mainly configured to: when load of an active antenna system (AAS) cell is greater than or equal to a load threshold, if a cell in an optimized area is not overloaded, load of a first cell is less than the load of the AAS cell, and load of a second cell is less than the load of the AAS cell, acquire a first antenna parameter combination corresponding to a maximum capacity of the optimized area, where the first cell and the second cell are two cells obtained after the AAS cell is pre-split, the optimized area is the AAS cell, or is the AAS cell and at least one neighboring cell of the AAS cell, and the first antenna parameter combination includes a first antenna parameter of the first cell and a second antenna parameter of the second cell, where: the first antenna parameter includes a downtilt of a first antenna and a transmit power of the first antenna, and the second antenna parameter includes a downtilt of a second antenna and a transmit power of the second antenna.

The splitting unit 52 is connected to the acquiring unit 51, and is mainly configured to split an AAS antenna according to the first antenna parameter combination.

In a possible implementation manner, a coverage counter that is of the optimized area and corresponding to the first antenna parameter combination is greater than or equal to a coverage counter threshold.

In a possible implementation manner, the acquiring unit 51 may first calculate a coverage counter, and then calculate a capacity. In this way, the acquiring unit 51 may mainly include: a third acquiring subunit 511 and a fourth acquiring subunit 512. The third acquiring subunit 511 is mainly configured to acquire multiple antenna parameter combinations that meet a coverage condition, where the coverage condition refers to that the coverage counter of the optimized area is greater than or equal to the coverage counter threshold. The fourth acquiring subunit 512 is mainly configured to calculate a capacity that is of the optimized area and corresponding to the multiple antenna parameter combinations that meet the coverage condition, to acquire the first antenna parameter combination corresponding to the maximum capacity.

In a possible implementation manner, the third acquiring subunit 511 may mainly include: a fifth acquiring subunit 511a, a second estimation subunit 511b, a second coverage calculation subunit 511c, and a sixth acquiring subunit 511d. The fifth acquiring subunit 511a is mainly configured to acquire measurement information that is collected by user equipment in an optimized area within a preset duration. The second estimation subunit 511b is mainly configured to perform estimation on the basis of the measurement information by using multiple antenna parameter combinations, to obtain an estimated value that is of the measurement information and corresponding to each antenna parameter combination of the multiple antenna parameter combinations. The second coverage calculation subunit 511c is mainly configured to calculate, according to the estimated value of the measurement information, the coverage counter that is of the optimized area and corresponding to each antenna parameter combination. The sixth acquiring subunit 511d is mainly configured to compare calculated coverage counters corresponding to all the antenna parameter combinations with the coverage counter threshold, to acquire the multiple antenna parameter combinations that meet the coverage condition.

In a possible implementation manner, the measurement information includes an SINR and a reference signal received power (RSRP) that are of the user equipment; the second estimation subunit 511b is specifically configured to perform estimation on the basis of the SINR and the RSRP by using the multiple antenna parameter combinations, to obtain an estimated value of the SINR and an estimated value of the RSRP that are corresponding to each antenna parameter combination of the multiple antenna parameter combinations; and the second coverage calculation subunit 511c is specifically configured to calculate, according to the estimated value of the SINR and the estimated value of the RSRP, the coverage counter that is of the optimized area and corresponding to each antenna parameter combination.

In a possible implementation manner, the measurement information further includes a throughput of the user equipment; the second estimation subunit 511b is specifically further configured to perform estimation on the basis of the throughput by using the multiple antenna parameter combinations, to obtain an estimated value that is of the throughput and corresponding to each antenna parameter combination of the multiple antenna parameter combinations; and the fourth acquiring subunit 512 is specifically configured to: calculate, according to the estimated value of the SINR and the estimated value of the throughput, a resource block (RB) usage and a load difference rate that are of the optimized area and corresponding to each antenna parameter combination that meets the coverage condition; and calculate, according to the RB usage and the load difference rate, the capacity that is of the optimized area and corresponding to each antenna parameter combination that meets the coverage condition, to acquire an antenna parameter combination corresponding to the maximum capacity.

In a possible implementation manner, the acquiring unit 51 can also calculate a capacity and then calculate a coverage counter. In this way, the acquiring unit 51 is specifically configured to: acquire measurement information that is collected by user equipment in the optimized area within a preset duration; perform estimation on the basis of the measurement information by using multiple antenna parameter combinations, to obtain an estimated value that is of the measurement information and corresponding to each antenna parameter combination of the multiple antenna parameter combinations; calculate, according to the estimated value of the measurement information, a capacity that is of the optimized area and corresponding to each antenna parameter combination; and acquire, according to the capacity that is of the optimized area, corresponding to each antenna parameter combination, and calculated by the third capacity calculation subunit, the first antenna parameter combination that is of antenna parameter combinations meeting the coverage condition and that is corresponding to a maximum capacity of the optimized area, where the coverage condition refers to that the coverage counter of the optimized area is greater than or equal to the coverage counter threshold.

In a possible implementation manner, the capacity counter of the optimized area can be obtained by using Formula 1:

$$G1 = k1*p + k2*q \quad \text{Formula 1}$$

where p is the RB usage of the optimized area; q is the load difference rate of the optimized area; k1 and k2 are a proportion of the RB usage of the optimized area and a proportion of the load difference rate of the optimized area, respectively, and k1+k2=1; and G1 is the capacity counter, where a smaller capacity counter indicates a larger capacity.

In a possible implementation manner, Formula 2 is used as a formula for calculating the coverage counter:

$$F1 = k3 \frac{\sum_{i=1}^{n}(DLRSRP(i) \geq \text{Thresh}_{DLRSRP})}{n} + k4 \frac{\sum_{i=1}^{n}(DLRSSINR(i) \geq \text{Thresh}_{DLRSSINR})}{n} \quad \text{Formula 2}$$

where n is a quantity of pieces of the acquired measurement information of the optimized area; i=1, 2, . . . , n, where i is an integer; DLRSRP(i) and DLRSSINR(i) are the estimated value of the RSRP and the estimated value of the SINR, respectively; $\text{Thresh}_{DLRSRP}$ and $\text{Thresh}_{DLRSSINR}$ are an RSRP threshold and an SINR threshold, respectively; k3 and k4 are a proportion of the RSRP and a proportion of the SINR, respectively, and k3+k4=1; when DLRSRP(i) $\geq \text{Thresh}_{DLRSRP}$, (DLRSRP(i)$\geq \text{Thresh}_{DLRSRP}$) is 1, and otherwise, (DLRSRP(i)$\geq \text{Thresh}_{DLRSRP}$) is 0; and F1 is the coverage counter.

The controller 60 according to this embodiment of the present invention can be specifically configured to execute the antenna splitting method in an active antenna system in the foregoing Embodiment 3. For details about the antenna splitting method in an active antenna system in Embodiment 3, reference may be made to the foregoing embodiment.

According to the controller provided in this embodiment of the present invention, when load of an active antenna system (AAS) cell is greater than or equal to a load threshold, if a cell in an optimized area is not overloaded, load of a first cell is less than the load of the AAS cell, and load of a second cell is less than the load of the AAS cell, an acquiring unit may first acquire an antenna parameter combination of the optimized area that meets a coverage condition, and then acquire, according to the antenna parameter combination of the optimized area that meets the coverage condition, an antenna parameter combination corresponding to a maximum capacity of the optimized area. The controller can also first calculate a capacity of the optimized area, and then acquire, according to the capacity of the optimized area, an antenna parameter combination that is of antenna parameter combinations meeting the coverage condition and that is corresponding to a maximum capacity of the optimized area. Finally, the splitting unit can split the AAS antenna according to a beam corresponding to the antenna parameter combination that is acquired by the acquiring unit and corresponding to a maximum capacity of the optimized area. The controller provided in this embodiment of the present invention splits an antenna of a heavily loaded AAS cell by using an antenna parameter combination that meets a coverage condition and corresponding to a maximum capacity value, and can effectively reduce the load of the heavily loaded AAS cell, and effectively increase a capacity of the optimized area.

Embodiment 7

Figure 7:
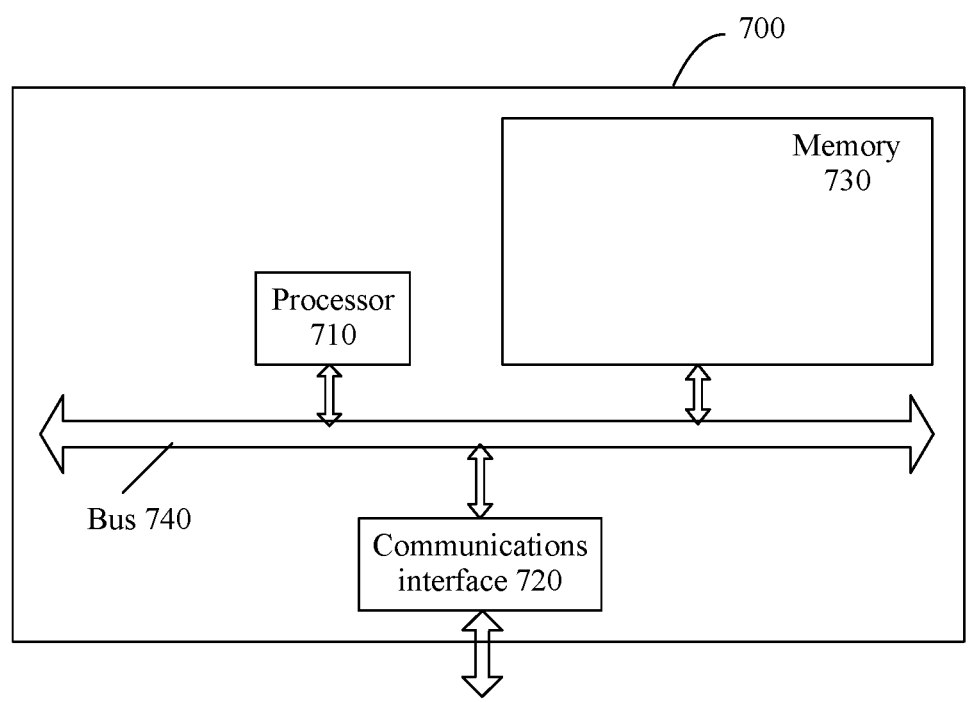
FIG. 7 is a structural block diagram of a controller according to still another embodiment of the present invention.

FIG. 7 is a structural block diagram of a controller according to still another embodiment of the present invention. The controller 700 may be a computation-capable host server, personal computer (PC), or portable computer or terminal, or the like. Specific implementation of a computing node is not limited in a specific embodiment of the present invention.

The controller 700 includes a processor (processor) 710, a communications interface (Communications Interface) 720, a memory (memory) 730, and a bus 740. The processor 710, the communications interface 720, and the memory 730 communicate with each other by using the bus 740.

The communications interface 720 is configured to communicate with a network element, where the network element includes, for example, a virtual machine management center and a shared memory.

The processor 710 is configured to execute a program. The processor 710 may be a central processing unit (CPU), an application-specific integrated circuit (ASIC), or one or more integrated circuits that are configured to implement an embodiment of the present invention.

The memory 730 is configured to store a file. The memory 730 may include a high-speed RAM memory, and may further include a non-volatile memory (non-volatile memory), for example, at least one disk memory. The memory 730 may also be a memory array. The memory 730 may also be divided into blocks, and the blocks may be combined into a virtual volume according to a rule.

In a possible implementation manner, the memory 730 stores program code that includes a computer operation instruction, and the processor 710 invokes the program code stored in the memory 730 to perform the following steps:

when load of an active antenna system (AAS) cell is greater than or equal to a load threshold, if a cell in an optimized area is not overloaded, load of a first cell is less than the load of the AAS cell, and load of a second cell is less than the load of the AAS cell, acquire a first antenna parameter combination corresponding to a maximum capacity of the optimized area, where the first cell and the second cell are two cells obtained after the AAS cell is pre-split, the optimized area is the AAS cell, or is the AAS cell and at least one neighboring cell of the AAS cell, and the first antenna parameter combination includes a first antenna parameter of the first cell and a second antenna parameter of the second cell, where: the first antenna parameter includes a downtilt of a first antenna and a transmit power of the first antenna, and the second antenna parameter includes a downtilt of a second antenna and a transmit power of the second antenna; and split an AAS antenna according to the first antenna parameter combination.

In a possible implementation manner, the acquiring a first antenna parameter combination corresponding to a maximum capacity of the optimized area includes:

acquiring measurement information that is collected by user equipment in the optimized area within a preset duration;

performing estimation on the basis of the measurement information by using multiple antenna parameter combinations, to obtain an estimated value that is of the measurement information and corresponding to each antenna parameter combination of the multiple antenna parameter combinations;

calculating, according to the estimated value of the measurement information, a capacity that is of the optimized area and corresponding to each antenna parameter combination; and acquiring, according to the capacity that is of the optimized area and corresponding to each antenna parameter combination, the first antenna parameter combination corresponding to the maximum capacity of the optimized area.

In a possible implementation manner, the measurement information includes a signal to interference plus noise ratio (SINR) and a throughput that are of the user equipment; and the performing estimation on the basis of the measurement information by using multiple antenna parameter combinations, to obtain an estimated value that is of the measurement information and corresponding to each antenna parameter combination of the multiple antenna parameter combinations specifically includes:

performing estimation on the basis of the SINR and the throughput by using the multiple antenna parameter combinations, to obtain an estimated value of the SINR and an estimated value of the throughput that are corresponding to each antenna combination of the multiple antenna parameter combinations.

In a possible implementation manner, the calculating, according to the estimated value of the measurement information, a capacity that is of the optimized area and corresponding to each antenna parameter combination specifically includes:

calculating, according to the estimated value of the SINR and the estimated value of the throughput, a resource block (RB) usage and a load difference rate that are of the optimized area and corresponding to each antenna parameter combination; and calculating, according to the RB usage and the load difference rate, the capacity that is of the optimized area and corresponding to each antenna parameter combination.

In a possible implementation manner, the acquiring a first antenna parameter combination corresponding to a maximum capacity of the optimized area further includes:

a coverage counter that is of the optimized area and corresponding to the first antenna parameter combination is greater than or equal to a coverage counter threshold.

In a possible implementation manner, the acquiring a first antenna parameter combination corresponding to a maximum capacity of the optimized area includes:

acquiring multiple antenna parameter combinations that meet a coverage condition, where the coverage condition refers to that the coverage counter of the optimized area is greater than or equal to the coverage counter threshold; and calculating the capacity that is of the optimized area and corresponding to the multiple antenna parameter combinations that meet the coverage condition, to acquire the first antenna parameter combination corresponding to the maximum capacity.

In a possible implementation manner, the acquiring antenna parameter combinations that meet a coverage condition includes:

acquiring measurement information that is collected by user equipment in the optimized area within a preset duration;

performing estimation on the basis of the measurement information by using multiple antenna parameter combinations, to obtain an estimated value that is of the measurement information and corresponding to each antenna parameter combination of the multiple antenna parameter combinations;

calculating, according to the estimated value of the measurement information, a coverage counter that is of the optimized area and corresponding to each antenna parameter combination; and comparing calculated coverage counters corresponding to all the antenna parameter combinations with the coverage counter threshold, to acquire the multiple antenna parameter combinations that meet the coverage condition.

In a possible implementation manner, the measurement information includes an SINR and a reference signal received power (RSRP) that are of the user equipment; and the performing estimation on the basis of the measurement information by using multiple antenna parameter combinations, to obtain an estimated value that is of the measurement information and corresponding to each antenna parameter combination of the multiple antenna parameter combinations specifically includes:

performing estimation on the basis of the SINR and the RSRP by using the multiple antenna parameter combinations, to obtain an estimated value of the SINR and an estimated value of the RSRP that are corresponding to each antenna parameter combination of the multiple antenna parameter combinations; and the calculating, according to the estimated value of the measurement information, the coverage counter that is of the optimized area and corresponding to each antenna parameter combination specifically includes:

calculating, according to the estimated value of the SINR and the estimated value of the RSRP, the coverage counter that is of the optimized area and corresponding to each antenna parameter combination.

In a possible implementation manner, the measurement information further includes a throughput of the user equipment; and the performing estimation on the basis of the measurement information by using multiple antenna parameter combinations, to obtain an estimated value that is of the measurement information and corresponding to each antenna parameter combination of the multiple antenna parameter combinations specifically further includes:

performing estimation on the basis of the throughput by using the multiple antenna parameter combinations, to obtain an estimated value that is of the throughput and corresponding to each antenna parameter combination of the multiple antenna parameter combinations; and the calculating the capacity that is of the optimized area and corresponding to the multiple antenna parameter combinations that meet the coverage condition, to acquire the first antenna parameter combination corresponding to the maximum capacity specifically includes:

calculating, according to the estimated value of the SINR and the estimated value of the throughput, a resource block (RB) usage and a load difference rate that are of the optimized area and corresponding to each antenna parameter combination that meets the coverage condition; and calculating, according to the RB usage and the load difference rate, the capacity that is of the optimized area and corresponding to each antenna parameter combination that meets the coverage condition, to acquire an antenna parameter combination corresponding to the maximum capacity.

In a possible implementation manner, the acquiring a first antenna parameter combination corresponding to a maximum capacity of the optimized area includes:

acquiring measurement information that is collected by user equipment in the optimized area within a preset duration;

performing estimation on the basis of the measurement information by using multiple antenna parameter combinations, to obtain an estimated value that is of the measurement information and corresponding to each antenna parameter combination of the multiple antenna parameter combinations;

calculating, according to the estimated value of the measurement information, a capacity that is of the optimized area and corresponding to each antenna parameter combination; and acquiring, according to the calculated capacity that is of the optimized area and corresponding to each antenna parameter combination, the first antenna parameter combination that is of antenna parameter combinations meeting the coverage condition and that is corresponding to a maximum capacity of the optimized area, where the coverage condition refers to that the coverage counter of the optimized area is greater than or equal to the coverage counter threshold.

In a possible implementation manner, the capacity counter of the optimized area is obtained by using Formula 1:

$$G1 = k1*p + k2*q \quad \text{Formula 1}$$

where p is the RB usage of the optimized area; q is the load difference rate of the optimized area; k1 and k2 are a proportion of the RB usage of the optimized area and a proportion of the load difference rate of the optimized area, respectively, and k1+k2=1; and G1 is the capacity counter, where a smaller capacity counter indicates a larger capacity.

In a possible implementation manner, Formula 2 is used as a formula for calculating the coverage counter:

$$F1 = k3 \frac{\sum_{i=1}^{n}(DLRSRP(i) \geq \text{Thresh}_{DLRSRP})}{n} + k4 \frac{\sum_{i=1}^{n}(DLRSSINR(i) \geq \text{Thresh}_{DLRSSINR})}{n} \quad \text{Formula 2}$$

where n is a quantity of pieces of the acquired measurement information of the optimized area; i=1, 2, . . . , n, where i is an integer; DLRSRP(i) and DLRSSINR(i) are the estimated value of the RSRP and the estimated value of the SINR, respectively; $\text{Thresh}_{DLRSRP}$ and $\text{Thresh}_{DLRSSINR}$ are an RSRP threshold and an SINR threshold, respectively; k3 and k4 are a proportion of the RSRP and a proportion of the SINR, respectively, and k3+k4=1; when DLRSRP(i) $\geq \text{Thresh}_{DLRSRP}$, (DLRSRP(i)$\geq \text{Thresh}_{DLRSRP}$) is 1, and otherwise, (DLRSRP(i)$\geq \text{Thresh}_{DLRSRP}$) is 0; and F1 is the coverage counter.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented in a form of computer software and sold or used as an independent product, it can be deemed to some extent that all or some of the technical solutions of the present invention (for example, the part contributing to the prior art) are implemented in a form of a computer software product. The computer software product is generally stored in a computer readable storage medium and includes several instructions for instructing a computer device (which may be a personal computer, a server, or a network device, and the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An antenna splitting method in an active antenna system, the method comprising:
   acquiring a first antenna parameter combination corresponding to a maximum capacity of the optimized area when:
     load of an active antenna system (AAS) cell is greater than a load threshold,
     a cell in an optimized area is not overloaded,
     load of a first cell is less than the load of the AAS cell, and
     load of a second cell is less than the load of the AAS cell,
   wherein the first cell and the second cell are two cells obtained after the AAS cell is pre-split,
   wherein the optimized area is the AAS cell, or the optimized area is the AAS cell and at least one neighboring cell of the AAS cell, and
   wherein the first antenna parameter combination comprises a first antenna parameter of the first cell and a second antenna parameter of the second cell,
   wherein the first antenna parameter comprises a downtilt of a first antenna and a transmit power of the first antenna, and wherein the second antenna parameter comprises a downtilt of a second antenna and a transmit power of the second antenna; and splitting an AAS antenna according to the first antenna parameter combination.

2. The antenna splitting method in an active antenna system according to claim 1, wherein the acquiring a first antenna parameter combination corresponding to a maximum capacity of the optimized area comprises:
acquiring measurement information that is collected by user equipment in the optimized area within a preset duration;
performing estimation on the basis of the measurement information by using multiple antenna parameter combinations, to obtain an estimated value that is of the measurement information and corresponding to each antenna parameter combination of the multiple antenna parameter combinations;
calculating, according to the estimated value of the measurement information, a capacity that is of the optimized area and corresponding to each antenna parameter combination; and
acquiring, according to the capacity that is of the optimized area and corresponding to each antenna parameter combination, the first antenna parameter combination corresponding to the maximum capacity of the optimized area.

3. The antenna splitting method in an active antenna system according to claim 2, wherein the measurement information comprises a signal to interference plus noise ratio (SINR) and a throughput that are of the user equipment.

4. The antenna splitting method in an active antenna system according to claim 3, wherein the performing estimation on the basis of the measurement information by using multiple antenna parameter combinations, to obtain an estimated value that is of the measurement information and corresponding to each antenna parameter combination of the multiple antenna parameter combinations specifically comprises:
performing estimation on the basis of the SINR and the throughput by using the multiple antenna parameter combinations, to obtain an estimated value of the SINR and an estimated value of the throughput that are corresponding to each antenna parameter combination of the multiple antenna parameter combinations.

5. The antenna splitting method in an active antenna system according to claim 3, wherein the calculating, according to the estimated value of the measurement information, a capacity that is of the optimized area and corresponding to each antenna parameter combination specifically comprises:
calculating, according to the estimated value of the SINR and the estimated value of the throughput, a resource block (RB) usage and a load difference rate that are of the optimized area and corresponding to each antenna parameter combination; and
calculating, according to the RB usage and the load difference rate, the capacity that is of the optimized area and corresponding to each antenna parameter combination.

6. The antenna splitting method in an active antenna system according to claim 5, wherein calculating, according to the RB usage and the load difference rate, the capacity that is of the optimized area and corresponding to each antenna parameter combination, comprises:
calculating capacity counter of the optimized area based on:

$$G1=k1*p+k2*q,$$

wherein p is the RB usage of the optimized area; q is the load difference rate of the optimized area; k1 and k2 are a proportion of the RB usage of the optimized area and a proportion of the load difference rate of the optimized area, respectively, and k1+k2=1; and G1 is the capacity counter, wherein a smaller capacity counter indicates a larger capacity.

7. A controller comprising:
a processor; and
a memory coupled to the processor, wherein the memory comprises a program to be executed in the processor, wherein the program comprises instructions for:
acquiring a first antenna parameter combination corresponding to a maximum capacity of the optimized area when:
load of an active antenna system (AAS) cell is greater than or equal to a load threshold,
a cell in an optimized area is not overloaded,
load of a first cell is less than the load of the AAS cell, and
load of a second cell is less than the load of the AAS cell,
wherein the first cell and the second cell are two cells obtained after the AAS cell is pre-split,
wherein the optimized area is the AAS cell, or the optimized area is the AAS cell and at least one neighboring cell of the AAS cell, and
wherein the first antenna parameter combination comprises a first antenna parameter of the first cell and a second antenna parameter of the second cell,
wherein the first antenna parameter comprises a downtilt of a first antenna and a transmit power of the first antenna, and wherein the second antenna parameter comprises a downtilt of a second antenna and a transmit power of the second antenna; and
splitting an AAS antenna according to the first antenna parameter combination.

8. The controller according to claim 7, wherein the controller comprises a communications interface, and the program comprises instructions for:
acquiring measurement information that is collected by user equipment in the optimized area within a preset duration through the communications interface;
performing estimation on the basis of the measurement information by using multiple antenna parameter combinations, to obtain an estimated value that is of the measurement information and corresponding to each antenna parameter combination of the multiple antenna parameter combinations;
calculating, according to the estimated value of the measurement information, a capacity that is of the optimized area and corresponding to each antenna parameter combination; and
acquiring, according to the capacity that is of the optimized area, corresponding to each antenna parameter combination, the first antenna parameter combination corresponding to the maximum capacity of the optimized area.

9. The controller according to claim 8, wherein the measurement information comprises a signal to interference plus noise ratio (SINR) and a throughput that are of the user equipment.

10. The controller according to claim 9, wherein the program further comprises instructions for:
performing estimation on the basis of the SINR and the throughput by using the multiple antenna parameter combinations, to obtain an estimated value of the SINR and an estimated value of the throughput that are corresponding to each antenna parameter combination of the multiple antenna parameter combinations.

11. The controller according to claim 10, wherein the program comprises instructions for:
calculating, according to the estimated value of the SINR and the estimated value of the throughput, a resource block RB usage and a load difference rate that are of the optimized area and corresponding to each antenna parameter combination; and
calculating, according to the resource block (RB) usage and the load difference rate, the capacity that is of the optimized area and corresponding to each antenna parameter combination.

12. The controller according to claim 11, wherein the program comprises instructions for:
calculating a capacity counter of the optimized area based on:

$$G1 = k1*p + k2*q$$

wherein p is the RB usage of the optimized area; q is the load difference rate of the optimized area; k1 and k2 are a proportion of the RB usage of the optimized area and a proportion of the load difference rate of the optimized area, respectively, and k1+k2=1; and G1 is the capacity counter, wherein a smaller capacity counter indicates a larger capacity.

13. An antenna splitting method in an active antenna system, the method comprising:
acquiring a first antenna parameter combination corresponding to a maximum capacity of the optimized area when:
load of an active antenna system (AAS) cell is equal to a load threshold,
a cell in an optimized area is not overloaded,
load of a first cell is less than the load of the AAS cell, and
load of a second cell is less than the load of the AAS cell,
wherein the first cell and the second cell are two cells obtained after the AAS cell is pre-split,
wherein the optimized area is the AAS cell, or the optimized area is the AAS cell and at least one neighboring cell of the AAS cell, and
wherein the first antenna parameter combination comprises a first antenna parameter of the first cell and a second antenna parameter of the second cell,
wherein the first antenna parameter comprises a downtilt of a first antenna and a transmit power of the first antenna, and wherein the second antenna parameter comprises a downtilt of a second antenna and a transmit power of the second antenna; and
splitting an AAS antenna according to the first antenna parameter combination.

14. The antenna splitting method in an active antenna system according to claim 13, wherein the acquiring a first antenna parameter combination corresponding to a maximum capacity of the optimized area comprises:
acquiring measurement information that is collected by user equipment in the optimized area within a preset duration;
performing estimation on the basis of the measurement information by using multiple antenna parameter combinations, to obtain an estimated value that is of the measurement information and corresponding to each antenna parameter combination of the multiple antenna parameter combinations;
calculating, according to the estimated value of the measurement information, a capacity that is of the optimized area and corresponding to each antenna parameter combination; and
acquiring, according to the capacity that is of the optimized area and corresponding to each antenna parameter combination, the first antenna parameter combination corresponding to the maximum capacity of the optimized area.

15. The antenna splitting method in an active antenna system according to claim 14, wherein the measurement information comprises a signal to interference plus noise ratio (SINR) and a throughput that are of the user equipment.

16. The antenna splitting method in an active antenna system according to claim 15, wherein the performing estimation on the basis of the measurement information by using multiple antenna parameter combinations, to obtain an estimated value that is of the measurement information and corresponding to each antenna parameter combination of the multiple antenna parameter combinations specifically comprises:
performing estimation on the basis of the SINR and the throughput by using the multiple antenna parameter combinations, to obtain an estimated value of the SINR and an estimated value of the throughput that are corresponding to each antenna parameter combination of the multiple antenna parameter combinations.

17. The antenna splitting method in an active antenna system according to claim 16, wherein the calculating, according to the estimated value of the measurement information, a capacity that is of the optimized area and corresponding to each antenna parameter combination specifically comprises:
calculating, according to the estimated value of the SINR and the estimated value of the throughput, a resource block (RB) usage and a load difference rate that are of the optimized area and corresponding to each antenna parameter combination; and
calculating, according to the RB usage and the load difference rate, the capacity that is of the optimized area and corresponding to each antenna parameter combination.

18. The antenna splitting method in an active antenna system according to claim 17, wherein calculating, according to the RB usage and the load difference rate, the capacity that is of the optimized area and corresponding to each antenna parameter combination, comprises:
calculating capacity counter of the optimized area based on:

$$G1 = k1*p + k2*q$$

wherein p is the RB usage of the optimized area; q is the load difference rate of the optimized area; k1 and k2 are a proportion of the RB usage of the optimized area and a proportion of the load difference rate of the optimized area, respectively, and k1+k2=1; and G1 is the capacity counter, wherein a smaller capacity counter indicates a larger capacity.

* * * * *